US012631735B1

(12) United States Patent
Sayyah

(10) Patent No.: US 12,631,735 B1
(45) Date of Patent: May 19, 2026

(54) OPTICAL IMAGER AND METHOD USING SUBCARRIER MULTIPLEXING

(71) Applicant: HRL Laboratories, LLC, Malibu, CA (US)

(72) Inventor: Keyvan R. Sayyah, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 318 days.

(21) Appl. No.: 18/392,328

(22) Filed: Dec. 21, 2023

(51) Int. Cl.
| | |
|---|---|
| *G01S 7/4911* | (2020.01) |
| *G01S 7/481* | (2006.01) |
| *G01S 7/4914* | (2020.01) |
| *G01S 17/89* | (2020.01) |
| *H04B 10/548* | (2013.01) |
| *H04J 14/02* | (2006.01) |

(52) U.S. Cl.
CPC ........... *G01S 7/4911* (2013.01); *G01S 7/4811* (2013.01); *G01S 7/4914* (2013.01); *G01S 17/89* (2013.01); *H04B 10/548* (2013.01); *H04J 14/0298* (2013.01)

(58) Field of Classification Search
CPC .... G01S 7/4911; G01S 7/4811; G01S 7/4914; G01S 17/89; H04B 10/548; H04J 14/0298
USPC .......................................................... 398/76
See application file for complete search history.

(56) References Cited

U.S. PATENT DOCUMENTS

| | | | | |
|---|---|---|---|---|
| 11,619,716 | B1 * | 4/2023 | Barber .................... | G01S 7/484 |
| | | | | 356/4.01 |
| 12,326,521 | B2 * | 6/2025 | Bi ......................... | G02B 6/2746 |
| 12,332,387 | B2 * | 6/2025 | Lin ......................... | G01S 17/34 |
| 2021/0124118 | A1 | 4/2021 | Sayyah et al. | |
| 2023/0023043 | A1 * | 1/2023 | Salsbury ................. | G01S 17/34 |
| 2023/0213618 | A1 * | 7/2023 | Rekow ................... | G01S 7/4815 |
| | | | | 356/4.01 |
| 2023/0324551 | A1 * | 10/2023 | Khachaturian ......... | G01S 17/58 |
| | | | | 356/4.01 |
| 2024/0094350 | A1 * | 3/2024 | Lin ......................... | G01S 7/4917 |
| 2024/0094360 | A1 * | 3/2024 | Piggott ................. | G01S 7/4917 |
| 2024/0402305 | A1 * | 12/2024 | Manssen ............... | G01S 17/931 |

FOREIGN PATENT DOCUMENTS

| | | |
|---|---|---|
| WO | 2021/003717 A1 | 1/2021 |
| WO | 2021/150826 A1 | 7/2021 |
| WO | 2023/049423 A9 | 3/2023 |

OTHER PUBLICATIONS

K. Sayyah et al.; "Fully Integrated FMCW LiDAR Optical Engine on a Single Silicon Chip," Journal of Lightwave Technology, vol. 40, No. 9; pp. 2763-2772; May 1, 2022.

(Continued)

*Primary Examiner* — Dalzid E Singh
(74) *Attorney, Agent, or Firm* — Wheatstone IP Law Corporation; Milad G. Shara

(57) ABSTRACT

An optical imager with subcarrier multiplexing uses a source transmit beam to simultaneously emit SFM transmit beams towards a target and receives SFM receive beams reflected off the target. The SFM receive beams are combined to provide a total receive beam, and the total receive beam is combined with a reference beam having the same frequency modulation as the source transmit beam to provide a receive signal that is configured for extraction of image data associated with the target.

26 Claims, 12 Drawing Sheets

(56) References Cited

OTHER PUBLICATIONS

K. H. Nam et al.; "A 16-Times Frequency Multiplier for 5G Synthesizer," IEEE Transactions on Microwave Theory and Techniques, vol. 69, No. 11; 17 pp. Aug. 18, 2021.

F. Wang et al.; "Room Temperature Quantum Cascade Lasers with 22% Wall Plug Efficiency in Continuous-Wave Operation," Optics Express, vol. 28, No. 12; pp. 17532-17538; Jun. 8, 2020.

C. L. Canedy et al.; "Resonant-Cavity Infrared Detector with Five Quantum-Well Absorber and 34% External Quantum Efficiency at 4 μm," Optics Express, vol. 27, No. 3; pp. 3771-3781; Feb. 1, 2019.

K. J. Boller et al.; "Hybrid Integrated Semiconductor Lasers with Silicon Nitride Feedback Circuits," Photonics, vol. 7, No. 4; 33 pages; 2020.

J. He et al.; "Review of Photonic Integrated Optical Phased Arrays for Space Optical Communication," IEEE Access, vol. 8; 15 pages; Oct. 13, 2020.

C. V. Poulton et al.; "Long-Range LiDAR and Free-Space Data Communication with High-Performance Optical Phased Arrays," IEEE Journal of Selected Topics in Quantum Electronics, vol. 25, No. 5; 8 pages; Sep./Oct. 2019.

B.G. Lee et al.; "Silicon Photonic Switch Fabrics: Technology and Architecture," Journal of Lightwave Technology, vol. 37 No. 1; pp. 6-20; IEEE 2018.

* cited by examiner

Max half-angle scan

$$tan\phi = \frac{D_{Lens}}{2f_L}$$

Beam Waist

$$2w_0 = \frac{4\lambda}{\pi} \frac{f_L}{D_{Lens}}$$

Depth of Focus (DOF)

$$DOF = \frac{8\lambda}{\pi} (\frac{f_L}{D_{Lens}})^2$$

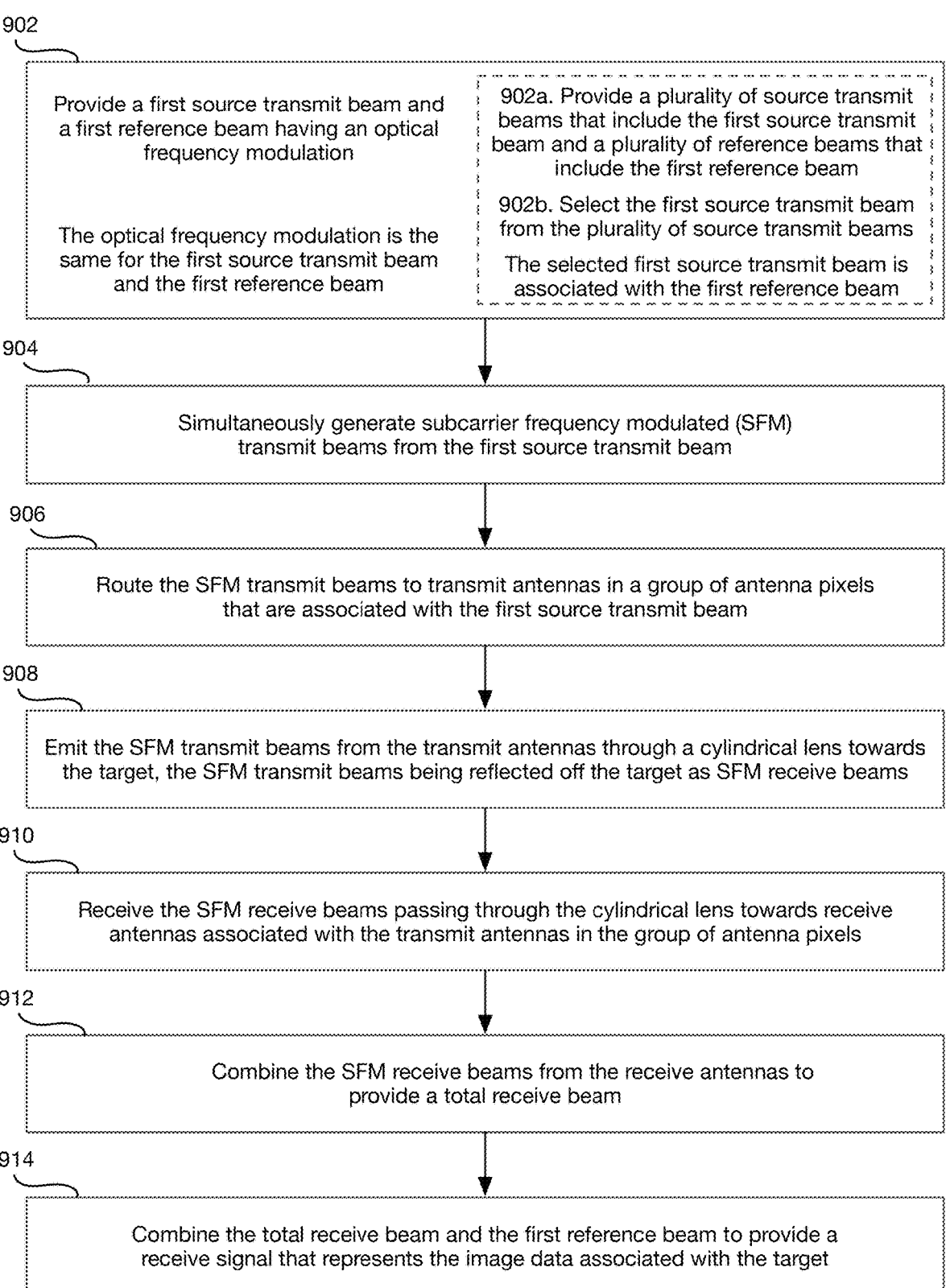

902

Provide a first source transmit beam and a first reference beam having an optical frequency modulation The optical frequency modulation is the same for the first source transmit beam and the first reference beam 902a. Provide a plurality of source transmit beams that include the first source transmit beam and a plurality of reference beams that include the first reference beam 902b. Select the first source transmit beam from the plurality of source transmit beams The selected first source transmit beam is associated with the first reference beam

904

Simultaneously generate subcarrier frequency modulated (SFM) transmit beams from the first source transmit beam

906

Route the SFM transmit beams to transmit antennas in a group of antenna pixels that are associated with the first source transmit beam

908

Emit the SFM transmit beams from the transmit antennas through a cylindrical lens towards the target, the SFM transmit beams being reflected off the target as SFM receive beams

910

Receive the SFM receive beams passing through the cylindrical lens towards receive antennas associated with the transmit antennas in the group of antenna pixels

912

Combine the SFM receive beams from the receive antennas to provide a total receive beam

914

Combine the total receive beam and the first reference beam to provide a receive signal that represents the image data associated with the target

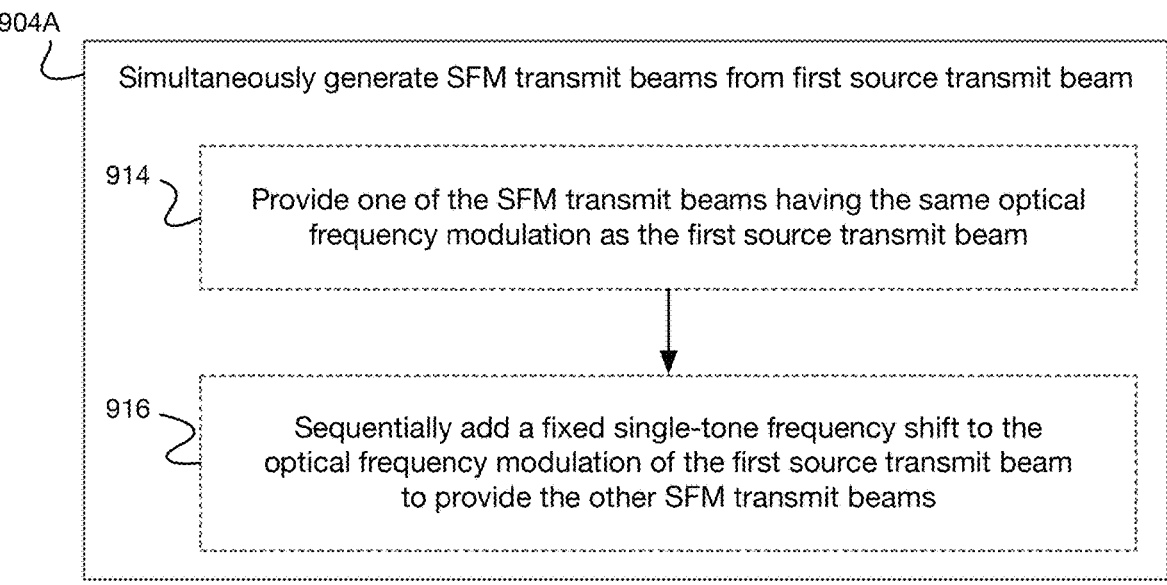

Simultaneously generate SFM transmit beams from first source transmit beam

914

Provide one of the SFM transmit beams having the same optical frequency modulation as the first source transmit beam

916

Sequentially add a fixed single-tone frequency shift to the optical frequency modulation of the first source transmit beam to provide the other SFM transmit beams

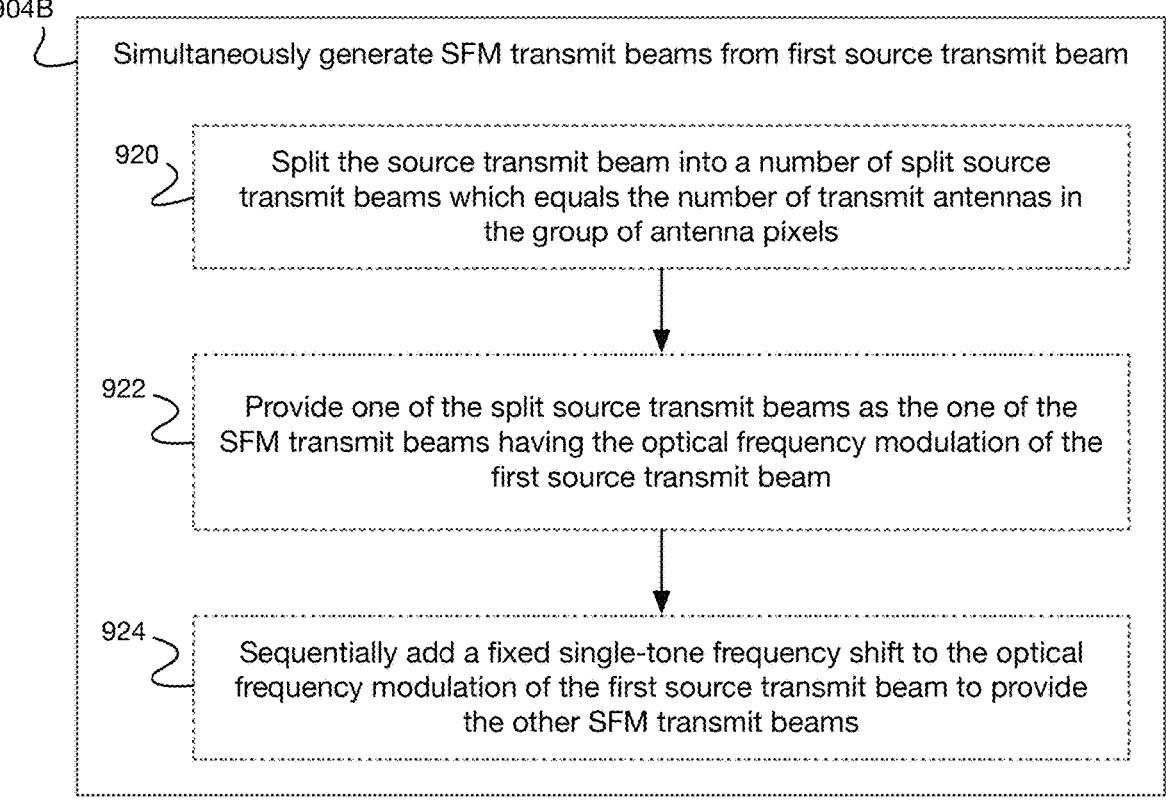

Simultaneously generate SFM transmit beams from first source transmit beam

920

Split the source transmit beam into a number of split source transmit beams which equals the number of transmit antennas in the group of antenna pixels

922

Provide one of the split source transmit beams as the one of the SFM transmit beams having the optical frequency modulation of the first source transmit beam

924

Sequentially add a fixed single-tone frequency shift to the optical frequency modulation of the first source transmit beam to provide the other SFM transmit beams

FIG. 9C

OPTICAL IMAGER AND METHOD USING SUBCARRIER MULTIPLEXING

TECHNICAL FIELD

This specification relates to optical imagers and sensors, including active imagers and LiDAR sensors.

BACKGROUND

Optical imagers are used for various sensor and object detection applications in different parts of the infrared (IR) and visible spectral regions. These applications drive imager performance parameters such as range, resolution, frame rate, signal-to-noise ratio, and power consumption, as well as imager packaging constraints such as size, weight, and cost.

There is a need for optical imagers that satisfy these imager performance parameters and packaging constraints for more accurate and cost-effective detection and identification of (a) low-emissivity camouflaged objects that are difficult to distinguish from background, (b) objects or non-flat terrains in foggy and hazy atmospheric conditions that impede detectability at visible wavelengths due to Mie scattering, or (c) objects hidden behind dense foliage in aerial imaging applications with very low levels of reflected or scattered light from the detected object due to foliage obstruction.

DESCRIPTION OF DRAWINGS

FIG. 9A illustrates a method of providing image data from a target detected by an optical imager that simultaneously routes SFM transmit beams to transmit antennas in at least one group of antenna pixels.

FIG. 9B-9C illustrate alternate embodiments of the method step in FIG. 9A for using the source transmit beam to simultaneously route SFM transmit beams to transmit antennas in at least one group of antenna pixels.

FIGS. 11A-11B illustrates data showing calculated frame rate and RF modulation frequency (FIG. 11A) and power consumption and signal-to-noise ratio (SNR) (FIG. 11B), as a function of the subcarrier multiplexing levels, in an embodiment of the optical imager of FIG. 8 that is configured for a 1024×512 pixel 2D/3D active MWIR imager using a two quantum cascade laser source each with 500 mW output power which are simultaneously turned on.

FIGS. 12A-12B illustrates data showing calculated frame rate and RF modulation frequency (FIG. 12A) and power consumption and SNR (FIG. 12B), as a function of the subcarrier multiplexing levels, in an embodiment of the optical imager of FIG. 8 that is configured for a 1024×512 pixel 2D/3D active MWIR imager using a four quantum cascade laser source each with 500 mW output power which are simultaneously turned on.

DETAILED DESCRIPTION

Figure 1:
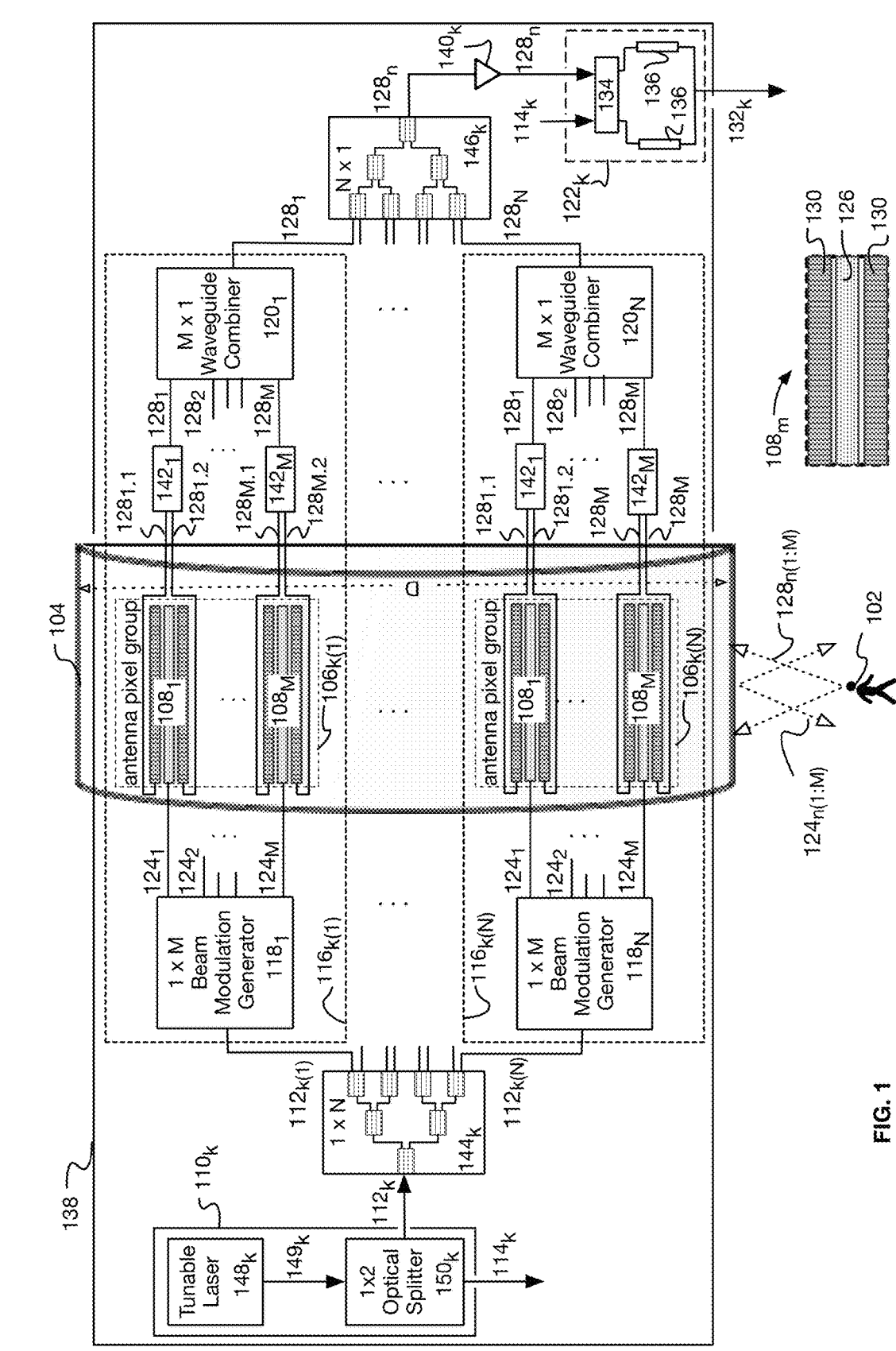
FIG. 1 is a diagram illustrating an embodiment of an optical imager having a subcarrier multiplexing group with a beam modulation generator that is configured to use a source transmit beam to simultaneously route subcarrier frequency modulated (SFM) transmit beams to transmit antennas in a group of antenna pixels.

FIGS. 1-13 illustrate embodiments and test data of an optical imager with subcarrier multiplexing (SCM) that uses a source transmit beam to simultaneously emit SFM transmit beams towards a target and receives SFM receive beams reflected off the target. The SFM receive beams are combined to provide a total receive beam, and the total receive beam is combined with a reference beam having the same optical frequency modulation as the source transmit beam to provide a receive signal that is configured for extraction of image data associated with the target.

In example embodiments, the disclosed subcarrier multiplexed active imaging architecture and processes may be used in optical imagers to improve object detection and identification for (a) autonomous vehicle and advanced driver assistance system sensors, (b) unmanned aerial vehicle imaging, or vertical takeoff and landing air taxi navigation in non-flat surfaces, and foggy and hazy atmospheric conditions, and (c) hidden objects behind dense foliage. According to an embodiment, the disclosed optical imager is a chip-scale, scan-based optical imager having improved frame rate and capability of three-dimensional LiDAR-based detection with target range and velocity information. Also, the optical imager with subcarrier multiplexing may be configured as a chip-scale mid-wave infrared (MWIR) active imager having long range (>1 km) detection capability that can operate at room temperature without expensive and bulky cryostats needed for MWIR passive imager.

Scanning imagers typically have lower frame rates for long-range (>1 km) imaging. For example, the light roundtrip time for 1 km range is 6.7 µs. Assuming a detector integration time of 3.3 µs, the minimum dwell time of the transmit beam on each pixel is about 10 µs for a pixel-to-pixel scan speed of <1 µs. Accordingly, for a 1024×512 pixel active imager, the maximum frame rate is 0.19 Hz (5.24 s frame time).

The disclosed subcarrier multiplexing increases the frame of the optical imager while maintaining the number of two-dimensional pixels such as in a 1024×512 pixel format. The frame rate is increased by a factor of the number of M SFM transmit beams that are routed to a corresponding number of M transmit antennas in a group of M antenna pixels that include receive antennas associated with the M transmit antennas (increase frame rate by factor of M). The frame rate can be further increased by an additional factor of increasing the number of K laser systems that are simultaneously activated to drive the M SFM transmit beams in each of the N subcarrier multiplexing groups that are associated with each of the K laser systems (increase frame rate by M×K).

The disclosed embodiments include an indexed numbering system with subscripts having lower case letters k, n, or m to identify: 1) association with the $k^{th}$ laser system in a number of K laser systems; 2) association with the $n^{th}$ subcarrier multiplexing group in a number of N subcarrier multiplexing groups; and 3) association with the $m^{th}$ antenna pixel in a group of M antenna pixels in each subcarrier multiplexing group.

FIG. 1 illustrates an embodiment of an optical imager 100 for providing image data from a target 102. The optical imager 100 comprises a cylindrical lens 104, at least one group $106_{k(n)}$ of antenna pixels $108_{1:M}$, at least one laser system $110_k$, at least one subcarrier multiplexing group $116_{k(n)}$, and at least one optical receiver $122_k$. The cylindrical lens 104 may be positioned one focal length above the at least one group of antenna pixels $106_{k(n)}$. The at least one group $106_{k(n)}$ of antenna pixels $108_{1:M}$ may be a 1D array of optical antennas. The optical antennas may include a waveguide based grating structure according to an embodiment. A coherent receiver portion of the optical imager 100 may include the at least one optical receiver $122_k$ having a 2×2 waveguide coupler 134 and two photodetectors 136, preferably in a balanced photodetector configuration. In an embodiment, the photodetectors 136 are resonant cavity photodetector which may increase the signal-to-noise (SNR) ratio for the optical imager 100.

The at least one laser system $110_k$ is configured to provide a source transmit beam $112_k$ and a reference beam $114_k$, such as a local oscillator (LO) beam. The source transmit beam $112_k$ and the reference beam $114_k$ have a frequency modulation. The at least one subcarrier multiplexing group $116_{k(n)}$ comprises abeam modulation generator $118_n$ and a waveguide combiner $120_n$. The at least one subcarrier multiplexing group $116_{k(n)}$ is coupled to the at least one laser system $110_k$, the at least one group of antenna pixels $106_{k(n)}$, and the at least one optical receiver $122_k$.

For the at least one subcarrier multiplexing group $116_{k(n)}$, the beam modulation generator $118_n$ is configured to use the source transmit beam $112_k$ to simultaneously route SFM transmit beams $124_{1:M}$ to M transmit antennas 126 in the at least one group $106_{k(n)}$ of antenna pixels $108_{1:M}$. In an embodiment, the beam modulation generator $118_n$ is configured to provide one of the SFM transmit beams $124_{1:M}$ having the same frequency modulation as the source transmit beam $112_k$ and to sequentially add a fixed single-tone frequency shift to the frequency modulation of the source transmit beam $112_k$ to provide the other SFM transmit beams $124_{2:M}$.

The M transmit antennas 126 emit the SFM transmit beams $124_{n(1:M)}$ through the lens 104 towards the target 102, the SFM transmit beams $124_{n(1:M)}$ being reflected off the target 102 as SFM receive beams $128_{n(1:M)}$ passing through the lens 104 towards receive antennas 130 associated with the M transmit antennas 126 in the at least one group $106_{k(n)}$ of antenna pixels $108_{1:M}$.

The waveguide combiner $120_n$ is configured to combine the SFM receive beams $128_{1:M}$ from the receive antennas 130 to provide a total receive beam $128_n$. The at least one optical receiver $122_k$ is configured to combine the total receive beam $128_n$ and the reference beam $114_k$ to provide a receive signal $132_k$ that is configured for extraction of the image data associated with the target 102. The optical imager 100 may include at least one optical amplifier $140_k$ for amplifying the total receive beam $128_n$ provided to the at least one optical receiver $122_k$.

In the embodiment of FIG. 1, the at least one laser source system $110_k$ activates a group of M multiple antennas $108_{1:M}$ simultaneously and the resulting multiple (M) beams $124_{n(1:M)}$ illuminate the target 102 to increase the frame rate by a factor of M. The subcarrier multiplexing may be used as a coding technique for coding these multiple illumination beams, and the photodetector pair 136 in the optical receiver $122_k$ may be used for coherent detection in this multi-beam active imaging configuration.

The optical imager 100 may comprise a photonic integrated circuit 138 that includes the at least one group $106_{k(n)}$ of antenna pixels $108_{1:M}$, the at least one laser system $110_k$, the at least one subcarrier multiplexing group $116_{k(n)}$, and the at least one optical receiver $120_k$.

According to an embodiment, each antenna pixel $108_m$ in the at least one group $106_{k(n)}$ of antenna pixels $108_{1:M}$ comprises a transmit antenna 126 and at least two receive antennas 130. The transmit antenna 126 may be interleaved between the at least two receive antennas 130 in each antenna pixel $108_m$. Each of the two receive antennas 130 from each antenna pixel $108_m$ collects the $m^{th}$ SFM receive beam $128_{n(m)}$ and respectively provides a SFM receive beam $128_{m.1}$ and a SFM receive beam $128_{m.2}$. An integrated 2×1 optical coupler $142_m$ may be used to coherently combine the SFM receive beams $128_{m.1}$ and $128_{m.2}$ into one output waveguide as the SFM receive beam $128_m$. The 2×1 optical coupler $142_m$ may include an integrated Mach-Zehnder interferometer (MZI) in which a fixed phase shift of 180° is implemented in one waveguide arm of an otherwise symmetric interferometer resulting in the coherent combination of the two input lightwaves into an output waveguide.

The optical imager 100 may include at least one transmit optical switching network $144_k$ and at least one receive optical switching network $146_k$. The at least one transmit optical switching network $144_k$ is configured to route the source transmit beam $112_k$ from the at least one laser system $110_k$ to the beam modulation generator $118_n$ in the at least one subcarrier multiplexing group $116_{k(n)}$. The at least one receive optical switching network $146_k$ is configured to route the total receive beam $128_n$ from the waveguide combiner $120_n$ in the at least one subcarrier multiplexing group $116_{k(n)}$ to the at least one optical receiver $122_k$. The at least one transmit optical switching network $144_k$ and the at least one receive optical switching network $146_k$ may each include a fast (<1 μs) waveguide-based switch matrix network configured in a serial assembly of optical switches in a tree-based network. Other switch matrix topologies, such as butterfly, Benes, crosspoint and Banyan may also be used, as discussed in B. G. Lee et al., "Silicon photonic switch fabrics: Technology and architecture," JLT 2018, doi: 10.1109/JLT.2018.2876828. The at least one transmit optical switching network $144_k$ and the at least one receive optical switching network $146_k$ may each include 1×2 optical switching elements. The optical switches may be implemented using a number of integrated photonic switch approaches including, for example, Mach Zehnder interferometer (MZI) (integrated with optical phase shifters) and microring resonator (MRR) based switch architectures, or a microelectromechanical (MEMS) switch.

In an embodiment, the at least one laser system $110_k$ may include a tunable laser $148_k$, and the at least one transmit optical switching network $144_k$ and the at least one receiving switching network $146_k$ in conjunction with a position of the at least one group $106_{k(n)}$ of antenna pixels $108_{1:M}$ relative to an optical axis of the cylindrical lens $104$ may be configured for azimuthal beam steering. The wavelength of the tunable laser $148_k$ in the at least one laser system $110_k$ is scanned in conjunction with the at least one group $106_{k(n)}$ of antenna pixels $108_{1:M}$ for elevational beam steering. The tunable laser $148_k$ in the at least one laser system $110_k$ may be a quantum cascade laser emitting the source transmit beam $112_k$ in a MWIR wavelength band and the optical receiver $122_k$ may my include a photodetector $130$ that is a resonant cavity photodetector.

The laser source in the laser system $110_k$ may be a tunable laser, or a single frequency laser combined with an optical modulator to generate frequency modulation continuous waveform (FMCW) for the transmit beam. The laser system $110_k$ may include a 1×2 optical splitter $150_k$ to split a laser beam $149_K$ from the tunable laser $148_k$, or a combination of single frequency laser and an optical modulator, into the source transmit beam $112_k$ and the reference beam $114_k$.

Figures 2, 3:
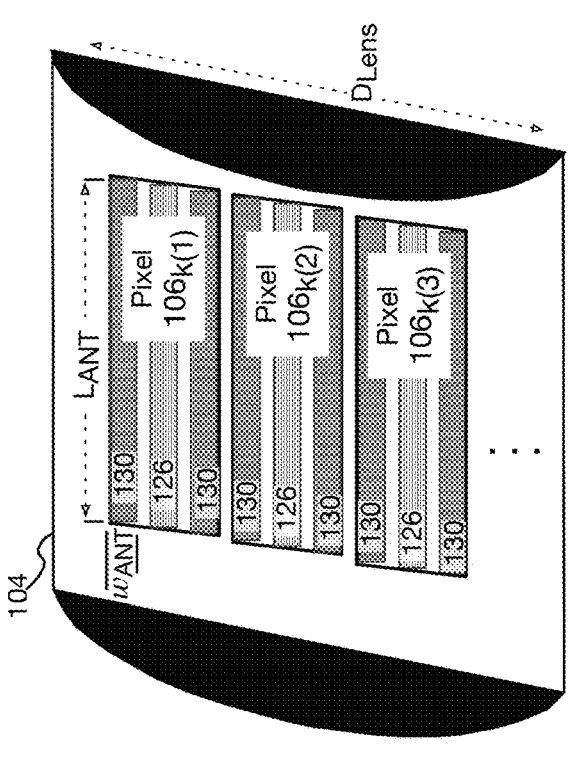
FIG. 2 shows a cross-sectional view of the optical imager of FIG. 1 based on the combination of a photonic chip with interleaved antennas and a collimating and focusing cylindrical lens.
FIG. 3 is a perspective view of the cylindrical lens together with antenna pixels in the optical imager of FIG. 1, each antenna pixel having a transmit antenna and multiple receive antennas where the antenna length is at least 100 times greater than the antenna width for the transmit antenna and the multiple receive antennas according to an embodiment.

FIGS. 2-3 shows a cross-sectional view of the active 2D/3D imager $100$ of FIG. 1 based on the combination of the photonic chip with the interleaved antenna elements and the collimating and focusing cylindrical lens (FIG. 2) and a perspective view of the cylindrical lens together some antenna pixels (FIG. 3). Each antenna pixel includes transmit antenna and multiple receive antennas where the antenna length is at least 100 times greater than the antenna width for the transmit antenna and the multiple receive antennas.

In an embodiment, 2D laser beam scanning in the direction perpendicular to the transmit antennas $126$ for image formation may be achieved by switching the laser light into one or concurrently into multiple transmit antenna elements $126$ in pixels $106_{k(n)}$, and in the direction parallel to the transmit antennas $126$ by scanning the wavelength of the laser source(s). Depending on the position of the transmit antenna element(s) $126$ relative to the cylindrical lens $104$ optics axis, the outgoing laser illumination is emitted at one or multiple angles simultaneously relative to the photonic chip normal, as illustrated at the SFM transmit (Tx) beam $124_{n(1)}$ and the SFM transmit beam $124_{n(3)}$ in FIG. 2.

The cross-sectional view in FIG. 2 illustrates two simultaneous SFM transmit beams (SFM transmit (Tx) beam $124_{n(1)}$ and transmit beam $124_{n(3)}$) at maximum steering angles via active transmit antennas $126$ from pixels $106_{k(1)}$ and $106_{k(3)}$ respectively at the edge of the photonic chip $138$.

A SFM transmit beam $124_{n(2)}$ (not shown) is emitted from the transmit antenna $126$ of pixel $106_{k(2)}$ simultaneously with the transmit beam $124_{n(1)}$ and the transmit beam $124_{n(3)}$. In this illustration, a portion of the receive light (SFM receive (Rx) beam $128_{n(2)}$) normally incident on the imager is collected by the cylindrical lens $104$ and focused on the central receive antenna elements $130$ in the pixel $106_{k(2)}$. The SFM receive beams $128_{n(1)}$ and $128_{n(3)}$ (not shown) are also collected by the cylindrical lens $104$ and focused on receive antenna elements $130$ in pixels $106_{k(1)}$ and $106_{k(3)}$, respectively.

The transmit antenna elements $126$ in the pixels $106_{k(1)}$ and $106_{k(3)}$ respectively at the edge of the chip $138$ may be activated by the switch matrix $144_k$ (or permanently turned on by direct activation with no switch matrix $144_k$ in the path) resulting in the two simultaneous transmit beams shown as transmit beam $124_{n(1)}$ and the transmit beam $124_{n(3)}$ each at the maximum of half of the total imager angular field-of-view (AFOV). As shown in the inset of FIG. 2, the maximum half-scan angle (φ) of the transmit beam relative to the lens optics axis is given by:

$$\tan\phi = \frac{D_{LENS}}{2f_L},$$

where $D_{LENS}$ and $f_L$ are the cylindrical lens aperture size and focal length, respectively. For example, for a 50 mm aperture cylindrical lens, the active imager total AFOV in the direction perpendicular to the antennas, $AFOV_\perp=53.1°$ and $28.1°$ for F/1 ($f_L=50$ mm) and F/2 ($f_L=100$ mm) lenses, respectively.

The instantaneous field-of-view IFOV of this 2D/3D active imager, which determines its angular resolution, in the direction parallel to the antennas is given by:

$$IFOV_\parallel = \frac{\lambda}{L_{ANT}}.$$

For antenna lengths of ~35 mm considered for a 2D/3D active imager embodiment operating in the MWIR spectral region, $IFOV_\parallel=0.11$ mrads for operation at 4 μm wavelength. The IFOV in the direction perpendicular to the antennas is given by $$IFOV_\perp = \frac{\lambda}{W_B},$$

where $W_B$ is the transmit light footprint (beamwidth) at the cylindrical lens surface before collimation. $W_B$ in turn is given by:

$$W_B = 2f_L\tan\left(\frac{\theta_i}{2}\right) = 2f_L\tan\left(\frac{\lambda}{2W_{ANT}}\right),$$

where $W_{ANT}$ is the width of the waveguide-based antenna. For a MWIR embodiment of the active imager with antenna waveguide width of 8 μm, the approximate $IFOV_\perp=0.16$ mrad and 0.08 mrad for a 50 mm cylindrical lens with F/1 and F/2 optics, respectively.

In an embodiment, the optical switch network in conjunction with the position of the optical antennas relative to the cylindrical lens optics axis may be used for 2D imager or 3D LiDAR azimuthal beam steering, and the source laser wavelength scanning in conjunction with the dispersive optical antennas may be used for 2D imager or 3D LiDAR elevational beam steering. Multiple simultaneous azimuthal 2D imager or 3D LiDAR beams may be generated by the azimuthal beam optical switching network. The photonic chip 138 and the cylindrical lens may be configured for operation in the MWIR spectral region, or in other relevant spectral bands.

Figure 4:
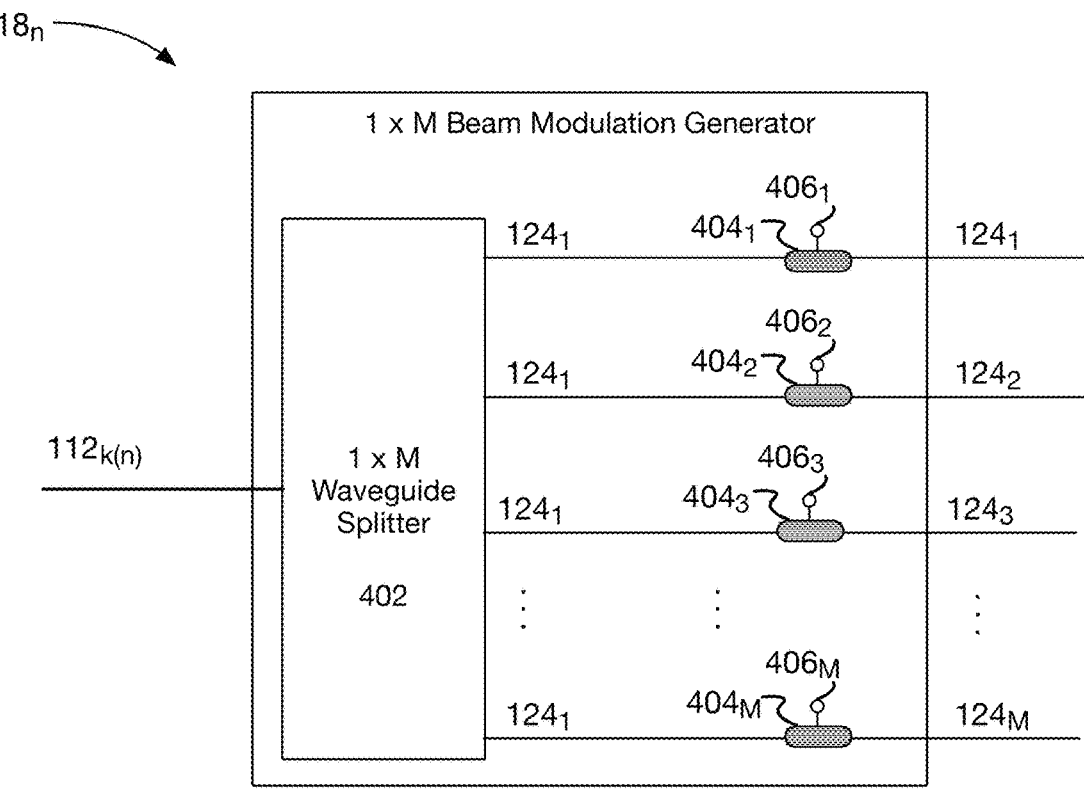
FIG. 4 illustrates an embodiment of the beam modulation generator in FIG. 1 for simultaneously routing the SFM transmit beams to transmit antennas in a group of antenna pixels.

In FIG. 4, an embodiment of the beam modulation generator $118_n$ in FIG. 1 is illustrated as a beam modulation generator $418_n$ having a 1×M waveguide splitter 402, a plurality of optical modulators $404_1$ to $404_M$, and a plurality of frequency synthesizers $406_1$ to $406_M$ coupled to the plurality of optical modulators $404_1$ to $404_M$. The waveguide splitter 402 is configured to split the source transmit beam $112_{k(n)}$ into a number of split source transmit beams $124_1$ which equals the M number of transmit antennas 126 in the at least one group $106_{k(n)}$ of antenna pixels $108_{1:M}$. The waveguide splitter 402 is configured to route the split source transmit beams $124_1$ to the plurality of optical modulators $404_1$ to $404_M$. The plurality of frequency synthesizers $406_1$ to $406_M$ are configured to:

(a) activate (drive) the plurality of optical modulators $404_1$ to $404_M$ to set zero frequency shift to one of the optical modulators $404_1$ to provide the one of the SFM transmit beams $124_1$ having the same frequency modulation as the source transmit beam $112_{k(n)}$; and (b) sequentially add a fixed single-tone frequency shift to the frequency modulation of the source transmit beam $112_{k(n)}$ to provide the other SFM transmit beams $124_2$ to $124_M$.

Figure 5:
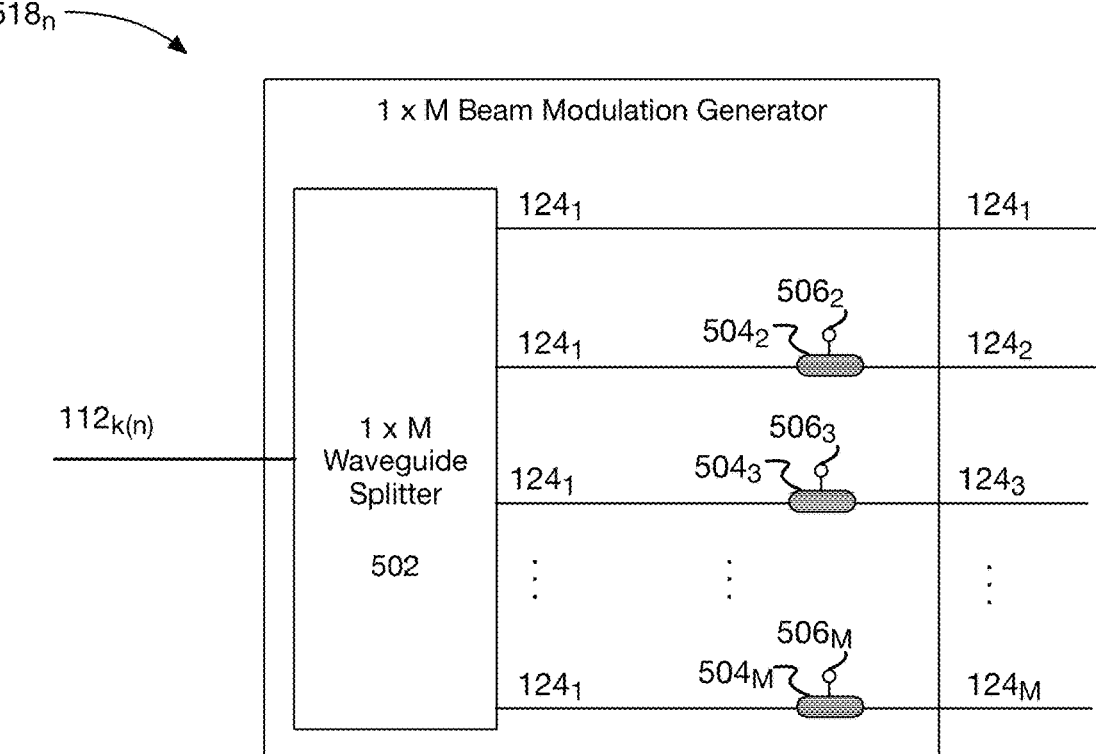
FIG. 5 illustrates an alternate embodiment of the beam modulation generator in FIG. 1 for simultaneously routing the SFM transmit beams to transmit antennas in a group of antenna pixels.

In FIG. 5, an alternate embodiment of the beam modulation generator $118_n$ in FIG. 1 is illustrated as a beam modulation generator $518_n$ having a 1×M waveguide splitter 502, a plurality of optical modulators $506_2$ to $506_M$, and a plurality of frequency synthesizers $508_2$ to $508_M$ coupled to the plurality of optical modulators $506_2$ to $506_M$. The waveguide splitter 502 is configured to split the source transmit beam $112_{k(n)}$ into a number of split source transmit beams $124_1$ which equals the M number of transmit antennas 126 in the at least one group $106_{k(n)}$ of antenna pixels $108_{1:M}$. The waveguide splitter 502 is configured to provide one of the split source transmit beams $124_1$ as the one of the SFM transmit beams $124_2$ to $124_2$ having the frequency modulation of the source transmit beam $112_{k(n)}$ and to route the other split source transmit beams $124_1$ to the plurality of optical modulators $504_2$ to $506_M$. The plurality of frequency synthesizers $508_2$ to $508_M$ are configured to activate (drive) the plurality of optical modulators $506_2$ to $506_M$ to sequentially add the fixed single-tone frequency shift to the frequency modulation of the source transmit beam $112_{k(n)}$ to provide the other SFM transmit beams $124_2$ to $124_2$.

Figure 6:
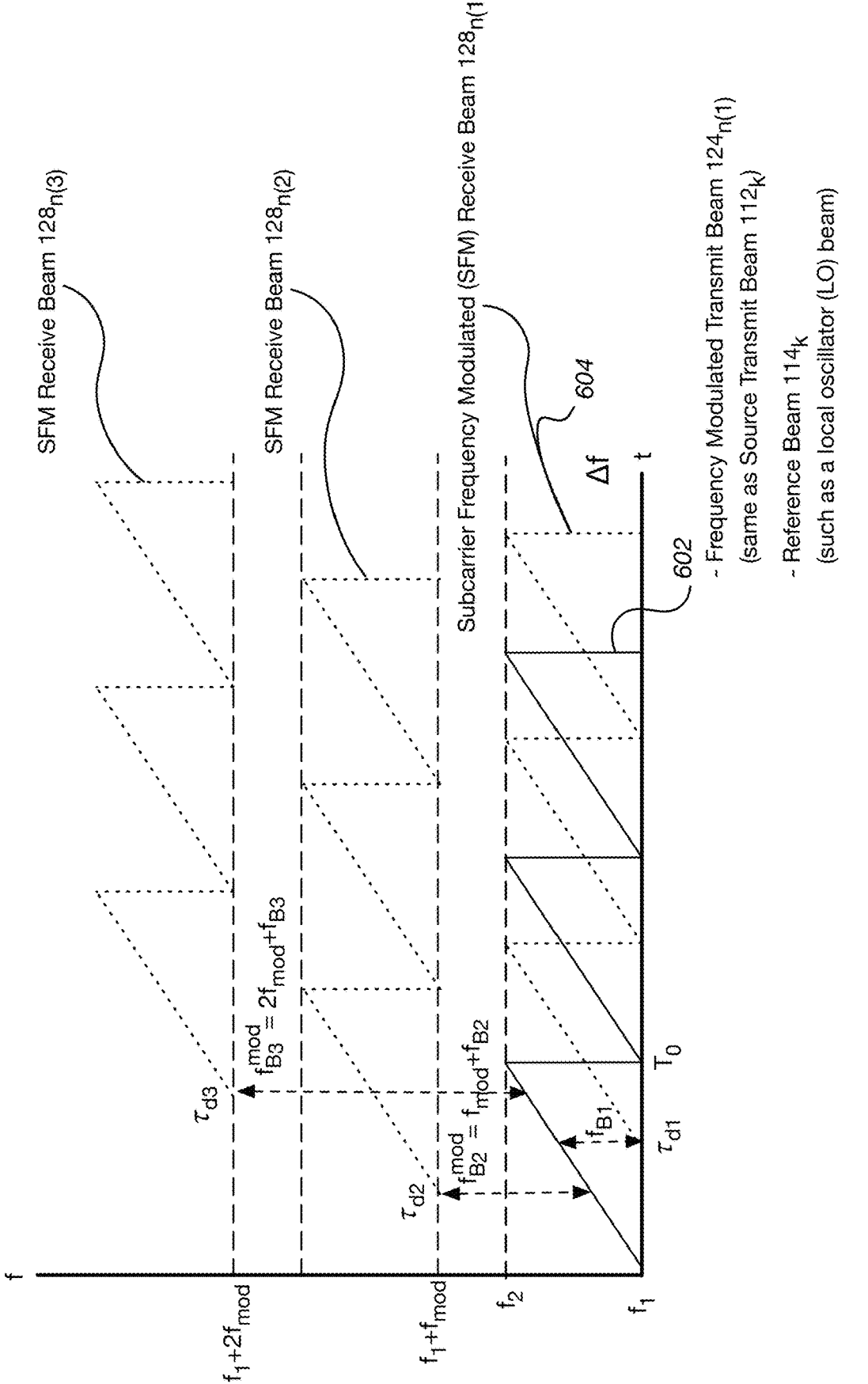
FIG. 6 shows optical frequency modulation ramp waveforms that illustrate an embodiment of subcarrier multiplexing coding with frequency shifting in the optical imager embodiment of FIG. 1.

FIG. 6 shows optical frequency modulation ramp waveforms that illustrate an embodiment of subcarrier multiplexing coding for frequency shifting in the beam modulation generator of FIGS. 1 and 4-5. The optical modulation waveforms are illustrated for a frequency modulated continuous wave (FMCW) 2D/3D (intensity/range) coherent detection imaging. The solid sawtooth waveform 602 depicts both the frequency modulated transmit beam $124_{(n)(1)}$, having the same frequency modulation as the source transmit beam $112_k$, and the reference beam $114_k$, such as a local oscillator (LO), in a time-domain frequency modulation waveform. The dashed sawtooth waveform 604 in the lower time-domain plot shows the corresponding scattered receive waveform of the frequency modulated receive bream $128_{n(1)}$, with round-trip delay time $\tau_{d1}$ for a given pixel of the image at range $R_1$ via illumination of a particular object 102 in the field-of-view. The signal $f_{B1}$ is the FMCW beat frequency signal which is related to the range R as:

$$f_B = \frac{2R\Delta f}{cT_0} \qquad \text{Equation 1}$$

Where, $\Delta f$ is the FMCW optical frequency modulation extent, $T_0$ is the period of the modulation waveform, and c is the speed of light in the above Equation 1.

The frequency modulated transmit beam $124_{n(1)}$ from the first optical transmit antenna 126 in a group of M transmit antennas $108_{1:M}$ of FIG. 1 is only modulated by the optical frequency ramp and not SCM coded (solid waveform 402). The corresponding receive waveform for this antenna (imager pixel) is depicted as the SFM receive beam $128_{n(1)}$ with time delay $\tau_{d1}$. In an embodiment, the optical modulation of the transmit light may be achieved by direct modulation of the laser source, or, alternately, using an on-chip optical modulator in tandem with the laser source. In an embodiment, the modulation format is a frequency modulated continuous wave (FMCW) modulation format for three-dimensional imaging functionality.

The other M−1 antennas in the group are RF subcarrier modulated with frequencies (M−1)$f_{mod}$, where $f_{mod}$ is the fundamental RF modulation frequency imposed on the optical ramp waveform via a separate high-speed optical modulator, such as $404_m$ of FIG. 4 of $504_m$ of FIG. 5, that may be placed before each optical transmit antenna 126 in the group of antenna pixels $108_{1:m}$. The RF subcarrier modulation imposed on the optical beam transmitted from the second transmit antenna 126 from antenna pixel $108_2$, with the original ramp frequency modulation, results in a receive beam waveform of the SFM receive beam $128_{n(2)}$ (middle dashed ramp waveform in FIG. 6). This receive optical ramp waveform is frequency shifted by $f_{mod}$ from its beat frequency $f_{B2}$ resulting from the RF frequency modulation sideband, with a round-trip delay time of $\tau_{d2}$ corresponding to the target range for that particular pixel in the imager field-of-view. Optical mixing of this receive waveform (frequency optical receive beam $128_{n(2)}$ and the LO (reference beam $114_k$) results in an RF beat frequency $$f_{B2}^{mod} = f_{B2} + f_{mod}.$$

The LO ramp waveform shown as reference beam $114_k$, which is directly waveguide-routed from the modulated laser to the photodetector pair 136 of the optical receiver $122_k$ for coherent detection, is the same for all antenna pixels $108_{1:M}$ in the SCM group $116_{k(n)}$ in the optical imager 100 of FIG. 1.

Similarly, the other simultaneously emitted transmit beams from the optical antenna pixels in this group of M antennas have RF beat frequencies, $f_{Bm}^{mod} = f_{Bm} + (m-1)f_{mod}$, where $$f_{Bm} = \frac{2R_m\Delta f}{cT_0},$$

and the round-trip delay times for the corresponding range ($R_m$) for each pixel given by:

$$\tau_m = \frac{2R_m}{c}.$$

The main criteria for non-ambiguous detection of the proper beat signal for a given antenna pixel is:

$$f_m \geq 2f_B(\text{max}) \geq \frac{4\Delta f R_{max}}{cT_0} \qquad \text{Equation 2}$$

Where $R_{max}$ is the maximum specified detection range for the 2D/3D active imager. The following is example illustrate how subcarrier multiplexing improves the frame rate of a 2D/3D active imager. Assuming a modulation frequency of $f_m$=0.5 GHz (500 MHz), $f_B$(max)=0.25 GHz, according to the above equation 2. Given a maximum imager detection range of 1 km, and FMCW ramp waveform period of 10 µs, the FMCW optical ramp frequency extent, $\Delta f$=0.375 GHz. Consequently, the 3D imager transform-limited range resolution, which is given by $$\Delta R = \frac{c}{2\Delta f},$$

is 40 cm for 1 km maximum range.

Figure 7:
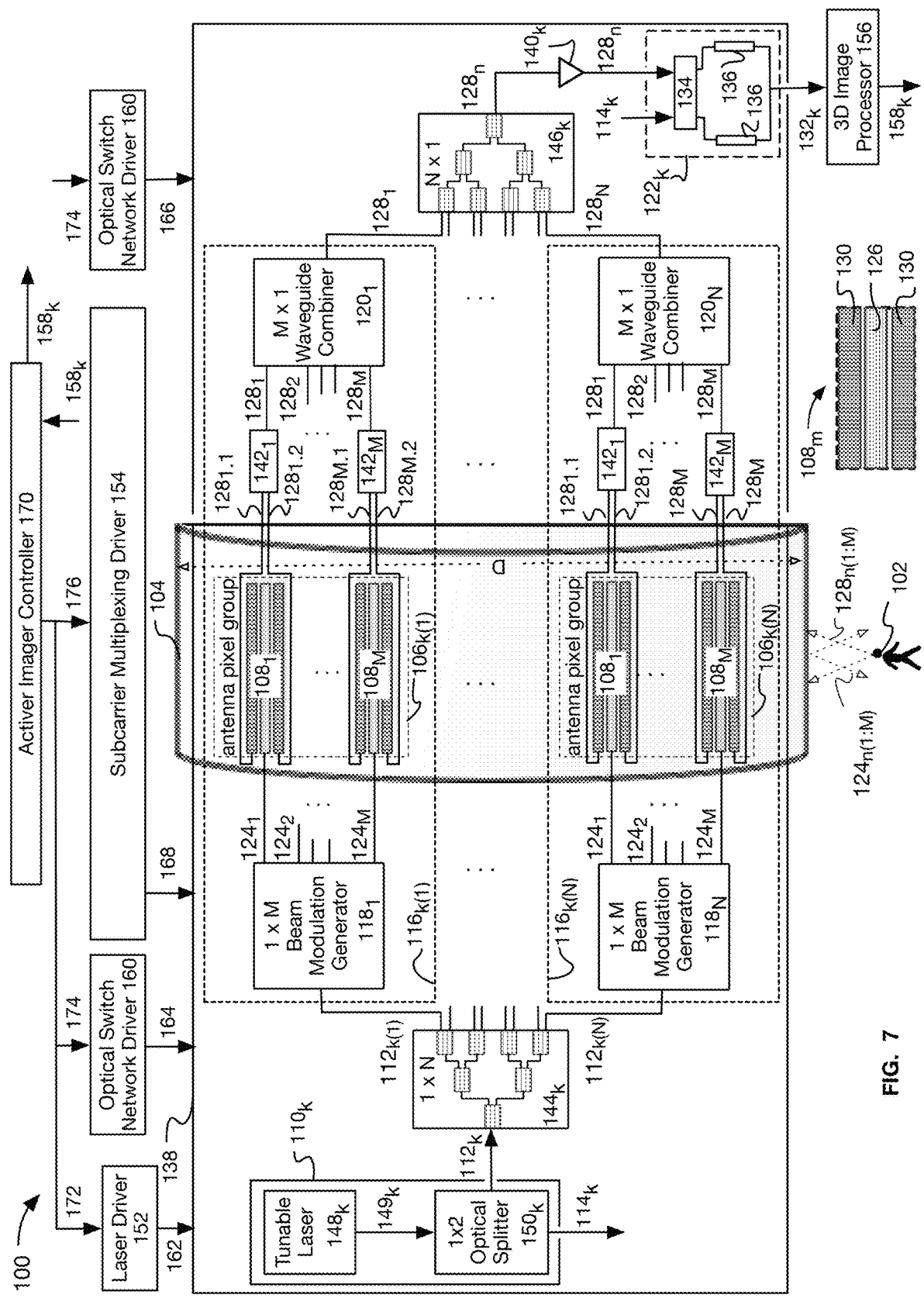
FIG. 7 is a diagram illustrating an optical imager controller, a laser driver, and a subcarrier multiplexing driver for subcarrier multiplexing optical beams, optical switch drivers, and a 3D image processor for extracting image data from a receive signal associated with a target according to an embodiment for the optical imager of FIG. 1.

In FIG. 7, the optical imager 100 of FIG. 1 may further include a laser driver 152, a subcarrier multiplexing driver 154, an optical switch network driver 160 for an embodiment having a plurality of subcarrier multiplexing groups $116_{k(1)}$ to $116_{k(N)}$, and a 3D image processor 156. The laser driver 152 is configured to control output power and wavelength of the at least one laser system $110_k$, as well as control the modulation properties of an optional external optical modulator following the tunable laser. The subcarrier multiplexing driver 154 is configured to control the single-tone frequency shift magnitude in the SFM transmit beams $124_1$ to $124_M$. The 3D image processor 156 is configured to detect and process the sensor data $158_k$ in the receive signal $132_k$ provided by the at least one optical receiver $122_k$. The optical switch network driver 160 controls which optical path n of the plurality of N paths are activated in both the 1×N transmit switching network $144_k$ and the N×1 receive switching network $146_k$ of the imager 100. The sensor data $158_k$ may include range and reflectance data processed from the receive signal $132_k$ or a sequence of receive signals $132_1$-$132_K$ during detection time periods or cycles.

For example, the laser driver 152 provides a driver control signal 162 to control the wavelength of the tunable laser $148_k$ for elevational beam steering. The optical switch matrix driver 160 provides a transmit optical switch control signal 164 to the transmit switching network $144_k$ and a receive switch control signal 166 to the receive switching network $146_k$ for azimuthal beam steering. The transmit switch control signal 164 switches the transmit path for the source transmit beam $112_k$ so that it is routed to the subcarrier multiplexing group $116_{k(n)}$. The subcarrier multiplexing (SCM) driver 154 provides an SCM control signal 168 for the beam modulation generator $118_n$ in the SCM group $116_{k(n)}$ to use the source transmit beam $112_{k(n)}$ to provide and route the SFM transmit beams $124_1$ to $124_M$ to the M transmit antennas 126 in the group of antenna pixels $108_{1:M}$.

The M transmit antennas 126 in the group of antenna pixels $108_{1:M}$ emit the SFM transmit beams $124_{n(1:M)}$ through the lens 104 towards the target 102. The SFM transmit beams $124_{n(1:M)}$ reflect off the target as SFM receive beams $128_{n(1:M)}$ passing through the lens 104 towards receive antennas associated with the M transmit antennas in the group of antenna pixels $108_{1:M}$.

The receive optical switch control signal 166 controls the receive switching network $146_k$ to (a) select the receive path for the total receive beam $128_n$ from the M×1 waveguide combiner $120_n$ in the SCM group $116_{k(n)}$ and (b) route the total receive beam $128_n$ to the optical receiver system $122_k$. The optical receiver system $122_k$ is configured, responsive to the total receive beam $128_n$, to generate the receive signal $132_k$. The 3D image processor 156 is configured to detect and process sensor data 158 in the receive signal $132_k$.

The optical imager 100 illustrated in the embodiment of FIG. 7 may include an active imager controller 170 for providing a laser operation command 172 to the laser driver 156, and an optical switch operation command 174 to the optical switch matrix driver 160, and a SCM frequency shift command 176 to the subcarrier multiplexing driver 154. The active imager controller 170 receives the sensor data $158_k$ from the 3D image processor 162 and provides the sensor data $158_k$ to a host device such as an object detector in an autonomous vehicle. The active imager controller 170 may be configured to perform further image processing of the sensor data $158_k$ for the host device. In the embodiment of the optical imager illustrated in FIG. 7, the photonic integrated circuit 148 is connected to the laser driver 152, the subcarrier multiplexing driver 154, the optical switch network driver 160, and the 3D imager processor 156. The optical imager 100 may further include a system-on-chip that integrates the active imager controller 170, the laser driver 152, the subcarrier multiplexer 154, the optical switch network driver 160, the 3D image processor 156, and the photonic integrated circuit 146.

Figure 8:
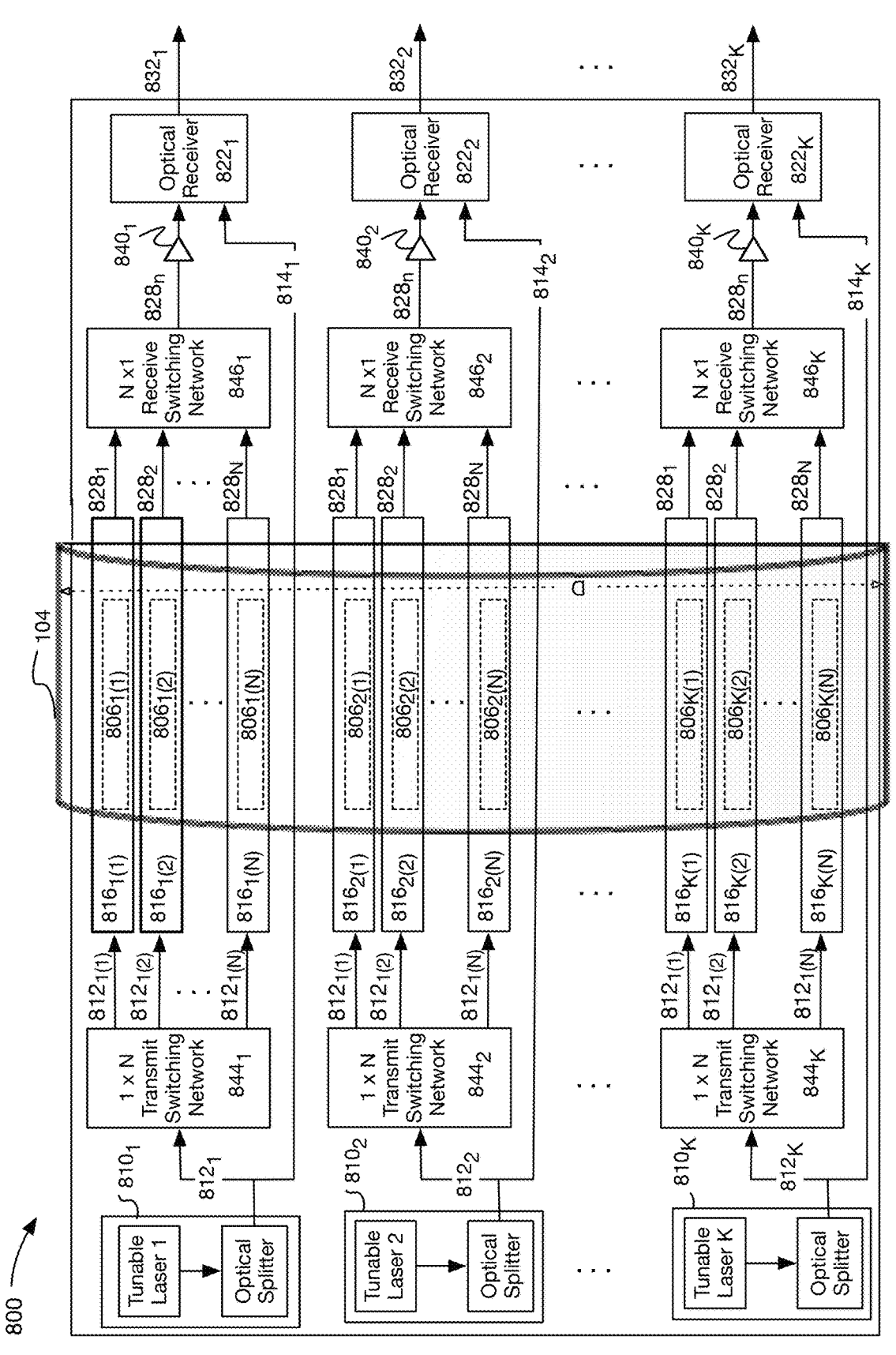
FIG. 8 illustrates an embodiment of the optical imager of FIG. 1 having a plurality of laser systems with each laser system being uniquely associated with its own transmit optical switching network, at least one subcarrier multiplexing group, at least one group of antenna pixels, and receive optical switching network.

In FIG. 8, an optical imager 800 illustrates an embodiment of the optical imager 100 of FIG. 1 which increases the frame rate by an additional factor of increasing the number of K laser systems that are simultaneously activated to drive the M SFM transmit beams in each of the N subcarrier multiplexing groups that are associated with each of the K laser systems (increase frame rate by M×K). The reference numbers for the optical imager 800 in FIG. 8 correspond to the reference numbers for the optical imager 100 of FIG. 1. For example, the source transmit beam $812_k$ and the reference beam $814_k$ in the optical imager 800 of FIG. 8 correspond to the source transmit beam $112_k$ and the reference beam $114_k$ in the optical imager 100 of FIG. 1. The description of the reference numbers for the embodiments in FIG. 1 are applicable to the corresponding reference numbers for the embodiments illustrated in FIG. 8.

In the embodiment of FIG. 8, the at least one laser system $118_k$ of FIG. 1 is in a plurality of laser systems $810_1$ to $810_K$. The at least one transmit optical switching network $144_k$ is in a plurality of transmit optical switching networks $844_1$ to $844_K$. The at least one subcarrier multiplexing group $116_{k(n)}$ is in a plurality of at least one subcarrier multiplexing groups $816_{1(n)}$ to $816_{K(n)}$. The at least one group of antenna pixels $106_{k(n)}$ is in a plurality of at least one group of antenna pixels $806_{1(n)}$ to $806_{K(n)}$. The at least one receive optical switching network $144_k$ is in a plurality of receive optical switching networks $846_1$ to $846_K$. The at least one optical receiver $122_k$ is in a plurality of optical receivers $822_1$ to $822_k$.

Each of the laser systems $810_k$ in the plurality of laser systems $810_1$ to $810_K$ is uniquely associated with one of the plurality of transmit optical switching networks $844_1$ to $844_K$, one of the plurality of at least one subcarrier multiplexing groups $816_{1(n)}$ to $816_{K(n)}$, one of the plurality of at least one group of antenna pixels $806_{1(n)}$ to $806_{K(n)}$, one of the plurality of receive optical switching networks $846_1$ to $846_K$, and one of the plurality of optical receivers $822_1$ to $822_K$.

FIGS. 9A-9C illustrate a method of providing image data from a target detected by an optical imager, such as the optical imager illustrated in FIGS. 1-8, which simultaneously routes SFM transmit beams to transmit antennas in at least one group of antenna pixels. In FIG. 9A, step 902 provides a first source transmit beam and a first reference beam having an optical frequency modulation. The optical frequency modulation is the same for the first source transmit beam and the first reference beam. In an embodiment, step 902a provides a plurality of source transmit beams that include the first source transmit beam and a plurality of reference beams that include the first reference beam. Step 902b selects the first source transmit beam from the plurality of source transmit beams. The selected first source transmit beam is associated with the first reference beam.

Step 904 simultaneously generates subcarrier frequency modulated (SFM) transmit beams from the first source transmit beam. Step 906 routes the SFM transmit beams to transmit antennas in a group of antenna pixels that are associated with the first source transmit beam. Step 908 emits the SFM transmit beams from the transmit antennas through a cylindrical lens towards the target, the SFM transmit beams being reflected off the target as SFM receive beams. Step 910 receives the SFM receive beams passing through the cylindrical lens towards receive antennas associated with the transmit antennas in the group of antenna pixels. Step 912 combines the SFM receive beams from the receive antennas to provide a total receive beam. Step 913 combines the total receive beam and the first reference beam to provide a receive signal that represents the image data associated with the target.

In an embodiment, step 902b may include instantaneously switching one of the plurality of source transmit beams to a beam modulation generator for simultaneously generating the SFM transmit beams in step 904 and subsequently routing the SFM transmit beams to the group of antenna pixels in step 906.

FIG. 9B illustrates an embodiment 904A for simultaneously generating the SFM transmit beams from the first source transmit beam in step 904 of FIG. 9A. In embodiment 904A, step 914 provides one of the SFM transmit beams having the same optical frequency modulation as the first source transmit beam. Step 916 sequentially adds a fixed single-tone frequency shift to the optical frequency modulation of the first source transmit beam to provide the other SFM transmit beams.

FIG. 9C illustrates an alternate embodiment 904B for simultaneously generating the SFM transmit beams from the first source transmit beam in the step 904 of FIG. 9A. In alternate embodiment 904B, step 920 splits the source transmit beam into a number of split source transmit beams which equals the number of transmit antennas in the group of antenna pixels. Step 922 provides one of the split source transmit beams as the one of the SFM transmit beams having the frequency modulation of the first source transmit beam. Step 924 sequentially adds the fixed single-tone frequency shift to the frequency modulation of the first source transmit beam to provide the other SFM transmit beams.

FIGS. 10-13 show calculated data for evaluating frame rate, modulation frequency, power consumption, and SNR in different M×K configurations for a 1024×512 pixel MWIR imager embodiment of the optical imager in FIGS. 1 and 8. The calculated data is based on active MWIR imager with 1024×512 pixels, the longitudinal 1024 pixels can be addressed by a combination of SCM and multiple quantum cascade laser (QCL) sources for simultaneous illumination of the scene. The SCM multiplexed groups of these pixels are longitudinally scanned via the optical switch network in order to illuminate the entire imager field-of-view.

The practical limitation for maximum number of parallel beams in the SCM scheme is two-fold: (1) the maximum practical frequency of the RF synthesizers that are integrated on the photonic chip in terms of power consumption and cost, and (2) reduced SNR per pixel due to lower transmit optical power per antenna resulting from larger number M of optical power splits for subcarrier modulation before each antenna. These limitations in the SNR calculations for the 2D/3D active imager architecture depend on different levels of SCM multiplexing.

Another consideration for the implementation of the SCM scheme for increasing the active imager frame rate is the speed of the subcarrier frequency modulators $404_m$ and $504_m$ that are integrated on the photonic chip just before the optical antennas as shown respectively in the embodiments of the beam modulation generator $418_n$ of FIG. 4 and the beam modulation generator $518_n$ of FIG. 5. Optimum integrated photonic modulators should be based on the charge depletion effect in the semiconductor (such as Si), or alternatively heterogeneously integrated electro-optic modulators on the photonic platform. Both these approaches can result in modulators with 50-100 GHz modulation speed, and with minimal power consumption (<1 mW per modulator). RF synthesizers illustrated as $406_m$ and $506_m$ respectively in embodiments of the beam modulation generator $418_n$ of FIG. 4 and the beam modulation generator $518_n$ of FIG. 5 are needed to drive these modulators. The power consumption and cost of the amplified RF synthesizers increases as the output frequency and power increase.

For M=32 and $f_{mod}$=0.5 GHz, the maximum RF synthesizer frequency is 16 GHz. RF synthesizers with 16-28 GHz output frequency using 65-nm CMOS process have about 6 mW power consumption. Boosting the output voltage to drive the optical modulator requires a 16 GHz driver amplifier consuming about 300 mW of electrical power. Accordingly, the total modulator and RF driver circuitry power consumption for 32 such devices is about 10 W.

The SCM scheme is one approach to increase the frame rate of the 2D/3D active imager. Another approach is to use multiple laser sources for simultaneous emission of multiple transmit beams from the imager antenna elements, as shown in FIG. 8 (tunable laser 1 and tunable laser 2 are each a quantum cascade laser in the MWIR embodiment). The number of laser sources, K, simultaneously driving multiple transmitting antenna groups, each with M subcarrier-multiplexed antenna elements, will in turn increase the frame rate by that factor. Therefore, using both the SCM scheme and multiple laser sources will increase the frame rate of the 2D/3D active imaging architecture by a factor of M×K at the price of higher power consumption.

Figure 10B:
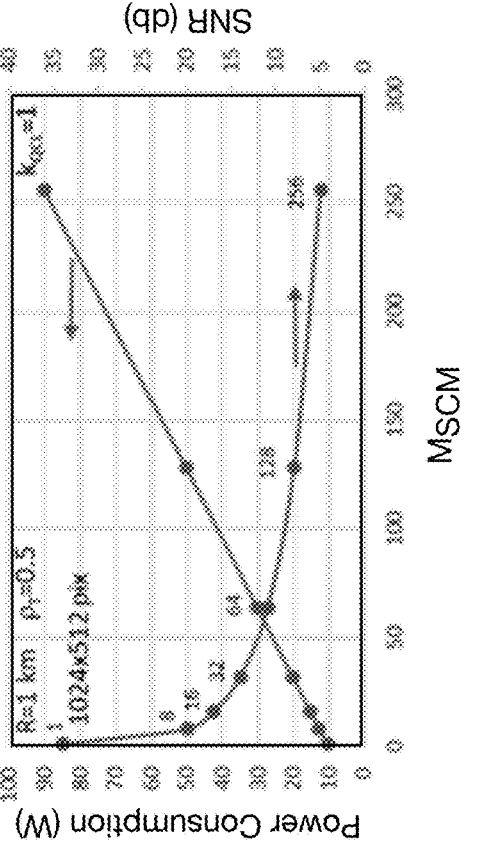
FIGS. 10A-10B illustrates data showing calculated frame rate and RF modulation frequency (FIG. 10A) and power consumption and SNR (FIG. 10B), as a function of the subcarrier multiplexing levels, in an embodiment of the optical imager of FIG. 1 that is configured for a 1024×512 pixel 2D/3D active MWIR imager using a single quantum cascade laser source with 500 mW output power.
Figure 10A:
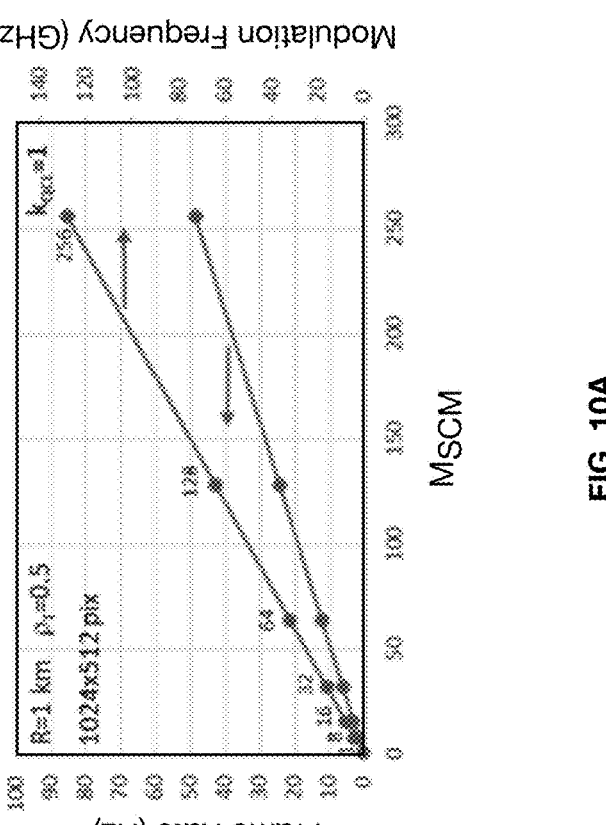

FIGS. 10A-10B show the calculated SNR, frame rate, power consumption and the required RF modulation frequencies for the case where K=1 (only one MWIR laser source) as a function of different SCM multiplexing levels, M. The SNR is calculated for a Lambertian target range of 1 km with 50% reflectivity in high atmospheric visibility conditions (V>50 km) using the following equation:

$$ SNR = \frac{2\eta_{PD}^2 P_{Tx} P_{LO} \rho_T d_{Rx}^2 \eta_{Rx} \eta_{pol} e^{-2\alpha_{atm}R} e^{\frac{-4\pi\Delta vR}{c}} G_{SOA}}{4R^2 \left[ 2q(\eta_{PD}P_{LO} + I_{DC})B_e + \frac{4KTB_e}{R_F} + NEP^2\eta_{PD}^2 B_e \right] NF_{SOA}} $$

Equation 3

Where, $\eta_{PD}$ is the photodetector responsivity, $P_{Tx}$ and $P_{LO}$ are the active imager transmit and local oscillator optical power levels, respectively, $\beta_T$ is the imaged object reflectivity, $d_{Rx}$ is the effective diameter of the cylindrical lens, $\eta_{Rx}$ is the efficiency of the receiver segment of the active imager, $\eta_{pol}$ is the light depolarization coefficient in transmission to and from the target, $\alpha_{atm}$ is the atmospheric extinction coefficient from absorption and scattering, $\Delta v$ is the effective linewidth of the active imager laser source, R is the range to the imaged object, $G_{SOA}$ and $NF_{SOA}$ are the gain and noise figure of the optional optical amplifier used in the receive section of the imager, respectively, $I_{DC}$ is the leakage current of the photodetector at the imager operating temperature, $B_e$ is the imager electrical bandwidth (inverse of integration time), $R_F$ is the post photodetector amplifier transimpedance gain, and NEP is the photoreceiver (photodetector and post detection amplifiers) noise-equivalent power.

The following Table 1 lists a summary of the values assumed for the parameters in the above Equation 3 for the calculation of the SNR in the calculated data shown in FIGS. 10-13:

$D_{LENS}$ is the cylindrical lens dimension in the direction perpendicular to the optical antennas, as shown FIG. 3). The effective receive aperture diameter is calculated using $$ d_{Rx} = \sqrt{\frac{4}{\pi} D_{LENS} L_{ANT}} , $$

considering the cylindrical lens-optical antenna configuration shown in schematic of FIG. 3. For a cylindrical lens with $D_{LENS}$=50 mm, and 35 mm long MWIR optical antennas, the calculated effective receive aperture diameter is 47.3 mm.

Another aspect of the 2D/3D active imager 100 of FIG. 1 is the implementation of resonant cavity photodetectors in the receiver section of the device. These type of photodetectors have a much thinner absorption region and have two mirrors placed above and below this region in order to significantly increase the quantum efficiency, and therefore the photo-responsivity, at the resonant wavelength of the

TABLE 1

List of System Parameters for
Calculation of SNR based on Equation 3

| $P_{QCL}$ W | $\Delta v_{QCL}$ kHz | $\Delta\lambda_{QCL}$ nm | $\eta_{QCL-CHIP}$ | $\eta_{Tx-SWN}$ | $\eta_{split}$ $\eta_{comb}$ | $\eta_{ANT}$ | $\eta_{Tx}$ |
|---|---|---|---|---|---|---|---|
| 0.5 | 1 | 300 | 0.7 | 0.8 | 0.9 | 0.7 | 0.35 |

| $P_{Tx}$ W | $P_{LO}$ W | $\eta_{ENS-ANT}$ | $\eta_{Rx-SWN}$ | $\eta_{Chip-QCA}$ | $\eta_{Rx}$ | $D_{LENS}$ Mm | $D_{Rx}$ mm |
|---|---|---|---|---|---|---|---|
| 0.175 | $5 \times 10^{-3}$ | 0.6 | 0.8 | 0.7 | 0.2 | 50 | 47.3 |

| $G_{QCA}$ db | $NF_{QCA}$ db | $\eta_{PD}$ AW | $R_F$ $\Omega$ | $R_F$ kHz | NEP W/rtHz | $\eta_{POL}$ | $L_{ANT}$ mm |
|---|---|---|---|---|---|---|---|
| 20 | 5 | 1.1 | 104 | 333 | $10^{-12}$ | 0.5 | 35 |

In Table 1:

$\eta_{QCL-Chip}$ is the optical coupling efficiency between the integrated MWIR QCL and the photonic chip input waveguide;

$\eta_{Tx-SWN}$ is the optical transmission efficiency of the transmit switch network;

$\eta_{Split}$ and $\eta_{Comb}$ are the optical efficiencies of the 1×M waveguide splitter (such as $402_n$ and $502_n$ in FIGS. 4 and 5) and M×1 combiner (such as 120 in FIG. 1) in the transmit and receive paths of the image sensor, respectively;

$\eta_{ANT}$ is the optical antenna outcoupling and incoupling efficiency;

$\eta_{LENS-ANT}$ is the optical coupling efficiency for the light collected by the cylindrical lens to the receive antenna pairs;

$\eta_{Chip-QCA}$ is the coupling efficiency between the photonic chip waveguide and the integrated quantum cascade amplifier (QCA) (such as $140_k$ in FIG. 1) in the receive path;

$L_{ANT}$ is the length of the optical antenna elements (such as $L_{ANT}$ in FIG. 3); and cavity, concurrent with reduced dark current. In an embodiment, the active 2D/3D imager 100 in FIG. 1 operates with a single-frequency (wavelength) laser for target illumination, and the resonant cavity photodetector is the optimum photodetector to implement in this active imager concept for improving its photo-responsivity at reduced photodetector dark current. For example, the resonant cavity photodetector may be used in embodiments operating the 2D/3D active imager in the MWIR spectral region. Resonant cavity photodetectors with >10× improvement in the quantum efficiency (up to 34%) have been demonstrated in the MWIR spectral region at room temperature, as discussed in C. L. Canedy, W. W. Bewley, C. D. Merritt, C. S. Kim, M. Kim, M. V. Warren, E. M. Jackson, J. A. Nodle, C. A. Affouda, E. H. Aifer, I. Vurgatman, and J. R. Meyer, "Resonant-cavity infrared detector with five quantum-well absorber and 34% external quantum efficiency," Optics Express, Vol. 27, No. 3, pp. 3771-3781.

The combination of the high quantum efficiency of these photodetectors at room temperature, with the coherent detection scheme used, may be used in embodiments of the optical imager 100 of FIG. 1 or optical imager 800 of FIG. 8 configured to operate as an active 2D/3D MWIR imager at room temperature.

In FIGS. 10A-10B, the calculated data shows the frame rate and RF modulation frequency (FIG. 10A) and power consumption and SNR (FIG. 10B), as a function of the subcarrier multiplexing levels M, in an embodiment of the optical imager 100 of FIG. 1 that is configured for a 1024×512 pixel 2D/3D active MWIR imager using a single, MWIR quantum cascade laser (QCL) source with 500 mW output power and 15% wall-plug-efficiency, resulting in a power consumption of 3.3 W. Furthermore, the modeling assumes that low noise (NF=5 dB), high gain (G=20 dB) QCA MWIR optical amplifiers in the receive path each consume 2 W of power, and the post detection analog and digital electronics for image processing have a total power consumption of 5 W. Also, the modeling assumes that each MWIR modulator has 50-100 GHz speed with an optical loss of 5 dB, consisting of 2 dB insertion loss and 3 dB side-band generation loss.

As the number of SCM level increases, the maximum RF synthesizer frequency increases, which results in increase in the modulator drive electronics power consumption. Also, the imager SNR decreases due to the higher number of QCL laser source light splits, reducing the transmit optical power for each antenna.

For example, with M=256, the maximum RF synthesizer frequency is 128 GHz, total power consumption is 90 W, and the imager SNR is only ~4 dB. However, these performance parameters may not be practical, even though the calculated frame rate is 50 Hz. The overall sweet spots in the calculations shown in FIGS. 10A-10B are for M=32 and 64, which results in 32 and 16 groups of SCM multiplexed antenna pixels that need to be electronically scanned, respectively. For these SCM multiplexing levels, the frame rate is 6 and 12 Hz, the power consumption is 20 and 30 W, and the SNR is 14 and 11 dB, respectively.

FIGS. 11-12 show the 2D/3D active MWIR imager calculated SNR, frame rate, power consumption and modulation frequency as a function of the number of SCM multiplexing levels for 2 and 4 QCL source lasers simultaneously turned on, with the corresponding number of optical amplifiers (QCAs) integrated on the photonic chip. As the number of integrated laser sources increases, the imager frame rate increases at the expense of power consumption, assuming other system parameters remain the same.

Figure 11B:
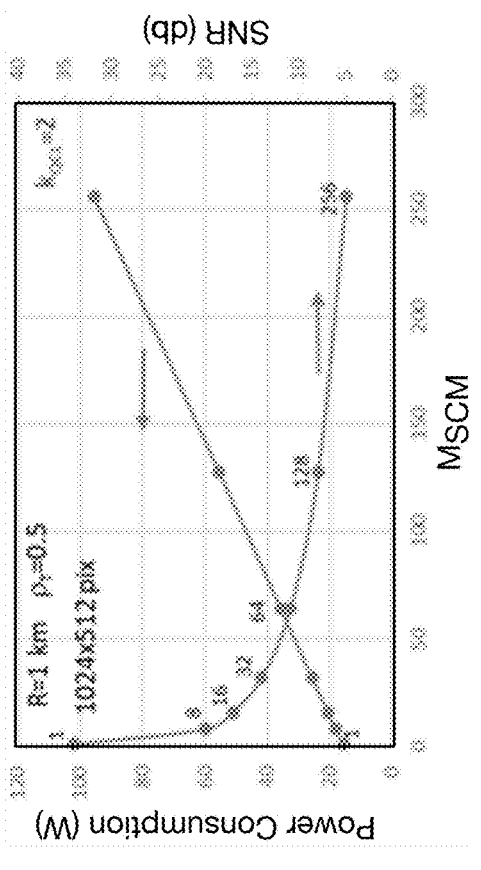
Figure 11A:
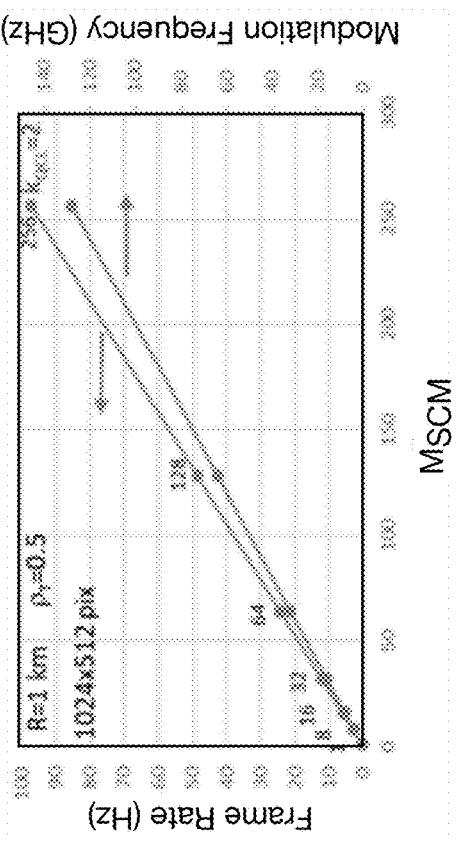

In FIGS. 11A-11B, the calculated data shows the frame rate and RF modulation frequency (FIG. 11A) and power consumption and SNR (FIG. 11B), as a function of the subcarrier multiplexing levels, in an embodiment of the optical imager of FIG. 8 that is configured for a 1024×512 pixel 2D/3D active MWIR imager using a two quantum cascade laser source each with 500 mW output power which are simultaneously turned on.

Figure 12B:
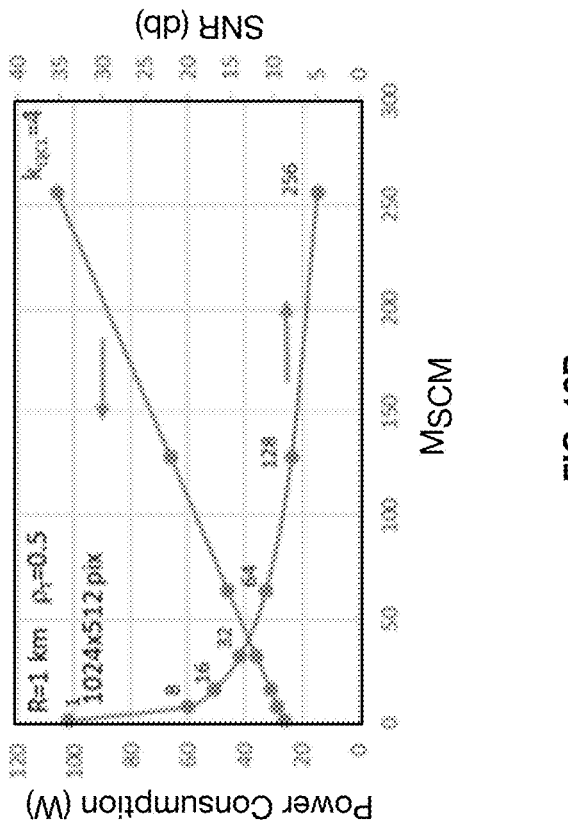
Figure 12A:
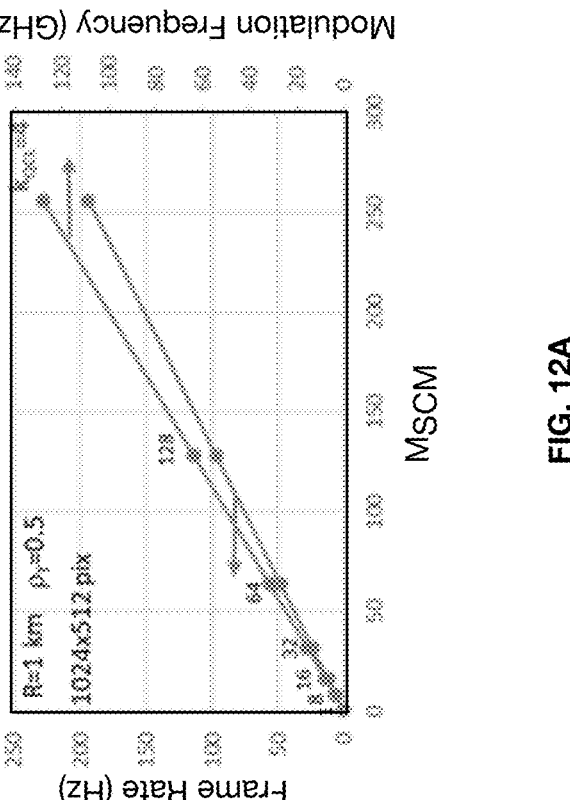

In FIGS. 12A-12B, the calculated data shows the frame rate and RF modulation frequency (FIG. 12A) and power consumption and SNR (FIG. 12B), as a function of the subcarrier multiplexing levels, in an embodiment of the optical imager of FIG. 8 that is configured for a 1024×512 pixel 2D/3D active MWIR imager using a four quantum cascade laser source with 500 mW output power which are simultaneously turned on.

Figure 13:
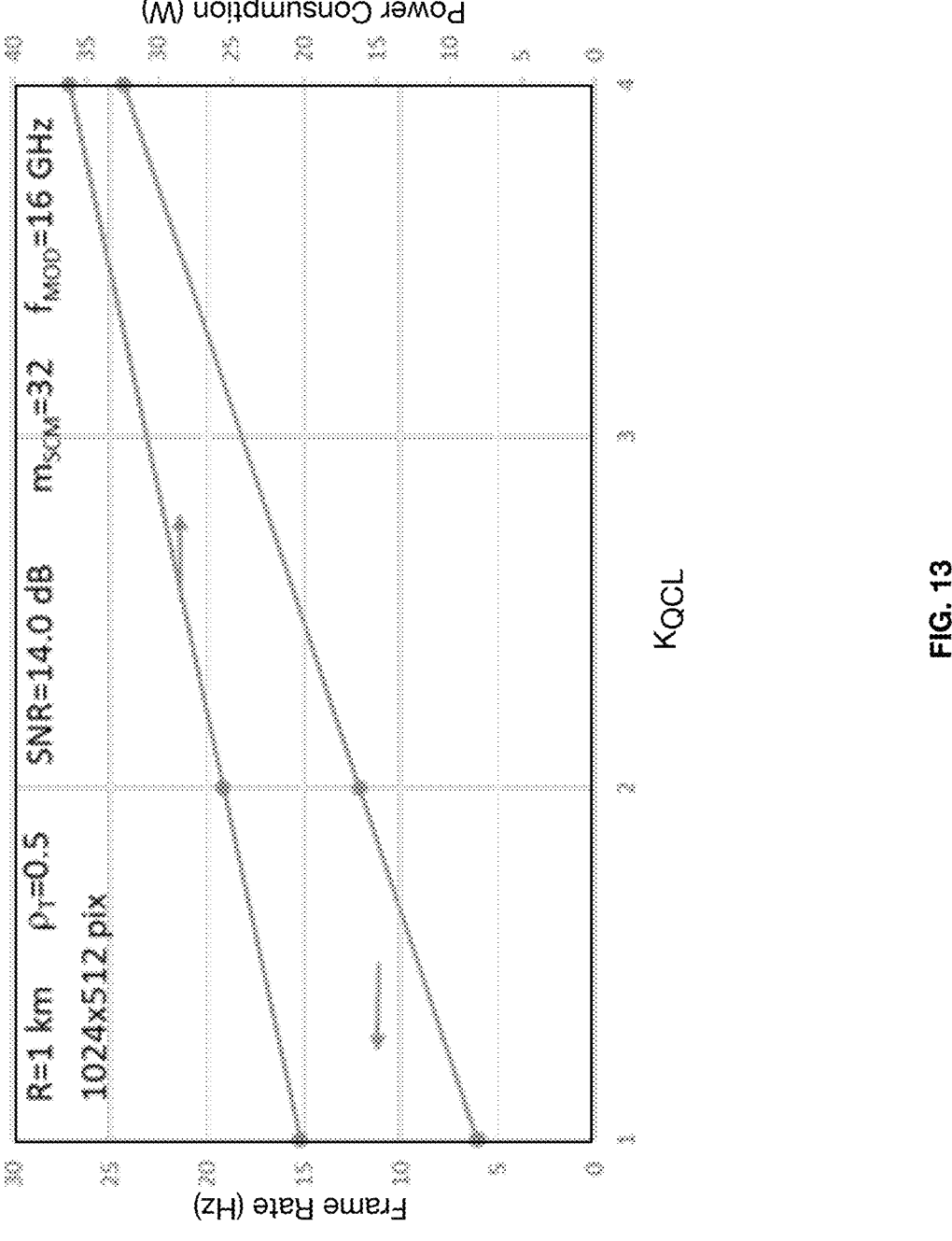
FIG. 13 illustrates data showing calculated frame rate and power consumption vs. number of integrated quantum cascade laser sources in embodiments of the optical imager of FIG. 8 configured as a 1024×512 pixel 2D/3D active MWIR imager.

FIG. 13 shows calculated data frame rate and power consumption vs. number of integrated quantum case laser sources in embodiments of the optical imager of FIG. 8 configured as a 1024×512 pixel 2D/3D active MWIR imager.

The calculated data in FIGS. 10-13 for the example configuration of the optical imager 100 of FIG. 1, and the optical imager 800 of FIG. 8, shows that for M=32 SCM multiplexing levels, the frame rate increases from 6 to 12 to 24 Hz as the number of integrated source lasers increase from 1 to 2 to 4. At the same time, the imager power consumption increases from 20 to 26 to 36 W, respectively. This is shown in FIGS. 11A-11B. The overall operational sweet spot for the active imager architecture, with the example configuration used for the calculated data, is for 2 integrated QCL laser sources with M=32, which results in a frame rate of 12 Hz, a power consumption of 25.6 W at a SNR of 14 dB. The maximum RF modulation frequency is 16 GHz, which is quite manageable.

A number of example embodiments have been described. Nevertheless, it will be understood that various modifications may be made without departing from the spirit and scope of the devices and methods described herein.

What is claimed is:

1. An optical imager for providing image data from a target, the optical imager comprising:
   a cylindrical lens;
   at least one group of antenna pixels;
   at least one laser system configured to provide a source transmit beam and a reference beam, the source transmit beam and the reference beam having an optical frequency modulation;
   at least one subcarrier multiplexing group comprising a beam modulation generator and a waveguide combiner; and
   at least one optical receiver;
   wherein:
   the at least one subcarrier multiplexing group is coupled to the at least one laser system, the at least one group of antenna pixels, and the at least one optical receiver;
   for the at least one subcarrier multiplexing group:
      the beam modulation generator is configured to use the source transmit beam to simultaneously route subcarrier frequency modulated (SFM) transmit beams to transmit antennas in the at least one group of antenna pixels;
      the transmit antennas emit the SFM transmit beams through the lens towards the target, the SFM transmit beams being reflected off the target as SFM receive beams passing through the lens towards receive antennas associated with the transmit antennas in the at least one group of antenna pixels; and
      the waveguide combiner is configured to combine the SFM receive beams from the receive antennas to provide a total receive beam;
   the at least one optical receiver is configured to combine the total receive beam and the reference beam to provide a receive signal that is configured for extraction of the image data associated with the target.

2. The optical imager of claim 1, wherein the beam modulation generator is configured to provide one of the SFM transmit beams having the same optical frequency modulation as the source transmit beam and to sequentially add a fixed single-tone frequency shift to the optical frequency modulation of the source transmit beam to provide the other SFM transmit beams.

3. The optical imager of claim 2, wherein the beam modulation generator further comprises:
   a waveguide splitter configured to split the source transmit beam into a number of split source transmit beams which equals the number of transmit antennas in the at least one group of antenna pixels;

a plurality of optical modulators;

a plurality of frequency synthesizers coupled to the plurality of optical modulators;

the waveguide splitter is configured to provide one of the split source transmit beams as the one of the SFM transmit beams having the optical frequency modulation of the source transmit beam and to route the other split source transmit beams to the plurality of optical modulators; and the plurality of frequency synthesizers are configured to activate the plurality of optical modulators to sequentially add the fixed single-tone frequency shift to the optical frequency modulation of the source transmit beam to provide the other SFM transmit beams.

4. The optical imager of claim 2, wherein the beam modulation generator further comprises:

a waveguide splitter configured to split the source transmit beam into a number of split source transmit beams which equals the number of transmit antennas in the at least one group of antenna pixels;

a plurality of optical modulators;

a plurality of frequency synthesizers coupled to the plurality of optical modulators;

the waveguide splitter is configured to route the split source transmit beams to the plurality of optical modulators;

the plurality of frequency synthesizers are configured to activate the plurality of optical modulators to:

set zero frequency shift to one of the optical modulators to provide the one of the SFM transmit beams having the same optical frequency modulation as the source transmit beam; and sequentially add the fixed single-tone frequency shift to the optical frequency modulation of the source transmit beam to provide the other SFM transmit beams.

5. The optical imager of claim 1, wherein the optical receiver comprises a photodetector that is a resonant cavity photodetector.

6. The optical imager of claim 1, further comprising:

at least one transmit optical switching network configured to couple the source transmit beam from the at least one laser system to the beam modulation generator in the at least one subcarrier multiplexing group; and at least one receive optical switching network configured to couple the receive beam from the waveguide combiner in the at least one subcarrier multiplexing group to the at least one optical receiver.

7. The optical imager of claim 6, wherein:

the cylindrical lens has an optical axis;

the at least one laser system comprises a tunable laser;

the at least one transmit optical switching network and the at least one receiving switching network in conjunction with a position of the at least one group of antenna pixels relative to the optical axis of the cylindrical lens are configured for azimuthal beam steering; and the wavelength of the tunable laser is scanned in conjunction with the at least one group of antenna pixels for elevational beam steering.

8. The optical imager of claim 7, wherein:

the tunable laser is a quantum cascade laser emitting the source transmit beam in a mid-wave infrared range; and the optical receiver comprises a photodetector that is a resonant cavity photodetector.

9. The optical imager of claim 6 further comprising a photonic integrated circuit that includes the at least one group of antenna pixels, the at least one laser system, the at least one subcarrier multiplexing group, at least one transmit optical switching network, at least one receive optical switching network, and the at least one optical receiver.

10. The optical imager of claim 6 further comprising:

a laser driver configured to control output power and wavelength of the at least one laser system;

a subcarrier multiplexing driver configured to control single-tone frequency shift magnitude in the SFM transmit beams;

an optical switching network driver configured to control activation of each subcarrier multiplexing group in the at least one subcarrier multiplexing group; and a 3D image processor configured to detect and process the sensor data in the receive signal provided by the at least one optical receiver.

11. The optical imager of claim 6, further comprising:

a plurality of laser systems that includes the at least one laser system;

a plurality of transmit optical switching networks that includes the at least one transmit optical switching network;

a plurality of at least one subcarrier multiplexing groups that includes the at least one subcarrier multiplexing group;

a plurality of at least one group of antenna pixels that includes the at least one group of antenna pixels;

a plurality of receive optical switching networks that includes the at least one receive optical switching network; and a plurality of optical receivers that includes the at least one optical receiver;

wherein:

each of the laser systems in the plurality of laser systems is uniquely associated with one of the plurality of transmit optical switching networks, one of the plurality of at least one subcarrier multiplexing groups, one of the plurality of at least one group of antenna pixels, one of the plurality of receive optical switching networks, and one of the plurality of optical receivers.

12. The optical imager of claim 1, wherein the cylindrical lens is positioned one focal length above the at least one group of antenna pixels.

13. The optical imager of claim 1, wherein each antenna pixel in the group of antenna pixels comprises a transmit antenna and at least two receive antennas.

14. The optical imager of claim 13, wherein the transmit antenna is interleaved between the at least two receive antennas for each antenna pixel in the group of antenna pixels.

15. A photonic integrated circuit for an optical imager that comprises a cylindrical lens and provides sensor data from a target, the photonic integrated circuit comprising:

at least one group of antenna pixels;

at least one laser system configured to provide a source transmit beam and a reference beam, the source transmit beam and the reference beam having an optical frequency modulation;

at least one subcarrier multiplexing group comprising a beam modulation generator and a waveguide combiner; and at least one optical receiver;

wherein:

the optical frequency modulation is the same for the source transmit beam and the reference beam;

the at least one subcarrier multiplexing group is coupled to the at least one laser system, the at least one group of antenna pixels, and the at least one optical receiver;

for the at least one subcarrier multiplexing group:

the beam modulation generator is configured to simultaneously route subcarrier frequency modulated (SFM) transmit beams to transmit antennas in the at least one group of antenna pixels;

the transmit antennas emit the SFM transmit beams through the lens towards the target, the SFM transmit beams being reflected off the target as SFM receive beams passing through the lens towards receive antennas associated with the transmit antennas in the at least one group of antenna pixels;

the waveguide combiner is configured to combine the SFM receive beams from the receive antennas to provide a total receive beam; and the at least one optical receiver is configured to combine the total receive beam and the reference beam to provide a receive signal that is configured for extraction of the image data associated with the target.

16. The photonic integrated circuit of claim 15, wherein the beam modulation generator is configured to provide one of the SFM transmit beams with the same optical frequency modulation as the source transmit beam and to sequentially add a fixed single-tone frequency shift to the optical frequency modulation of the source transmit beam to provide the other SFM transmit beams.

17. The photonic integrated circuit of claim 16, wherein the beam modulation generator further comprises:

a waveguide splitter configured to split the source transmit beam into a number of split source transmit beams which equals the number of transmit antennas in the at least one group of antenna pixels;

a plurality of optical modulators; and a plurality of frequency synthesizers coupled to the plurality of optical modulators;

the waveguide splitter is configured to route one of the split source transmit beams as one of the SFM transmit beams with the optical frequency modulation of the source transmit beam and to route the other split source transmit beams to the plurality of optical modulators; and the plurality of frequency synthesizers are configured to activate the plurality of optical modulators to sequentially add a fixed single-tone frequency shift to the optical frequency modulation of the source transmit beam to provide the other SFM transmit beams.

18. The photonic integrated circuit of claim 16, wherein the beam modulation generator further comprises:

a waveguide splitter configured to split the source transmit beam into a number of split source transmit beams which equals the number of transmit antennas in the at least one group of antenna pixels;

a plurality of optical modulators; and a plurality of frequency synthesizers coupled to the plurality of optical modulators;

wherein:

the waveguide splitter is configured to route the split source transmit beams to the plurality of optical modulators;

the plurality of frequency synthesizers are configured to activate the plurality of optical modulators to:

set zero frequency shift to one of the optical modulators for routing one of the SFM transmit beams with the same optical frequency modulation as the source transmit beam; and sequentially add a fixed single-tone frequency shift to the optical frequency modulation of the source transmit beam to provide the other SFM transmit beams.

19. The photonic integrated circuit of claim 15, wherein the optical receiver comprises a photodetector that is a resonant cavity photodetector.

20. The photonic integrated circuit of claim 15, further comprising:

at least one transmit optical switching network configured to couple the source transmit beam from the at least one laser system to the beam modulation generator in the at least one subcarrier multiplexing group; and at least one receive optical switching network configured to couple the receive beam from the waveguide combiner in the at least one subcarrier multiplexing group to the at least one optical receiver.

21. The photonic integrated circuit of 15, wherein each antenna pixel in the group of antenna pixels comprises a transmit antenna and at least two receive antennas.

22. The photonic integrated circuit of claim 21, wherein the transmit antenna is interleaved between the at least two receive antennas for each antenna pixel in the group of antenna pixels.

23. A method of providing image data from a target detected by an optical imager, the method comprising the steps of:

providing a first source transmit beam and a first reference beam each having an optical frequency modulation, wherein the optical frequency modulation is the same for the first source transmit beam and the first reference beam;

simultaneously generating subcarrier frequency modulated (SFM) transmit beams from the first source transmit beam;

routing the SFM transmit beams to transmit antennas in a group of antenna pixels that are associated with the first source transmit beam;

emitting the SFM transmit beams from the transmit antennas through a cylindrical lens towards the target, wherein the SFM transmit beams are reflected off the target as SFM receive beams;

receiving the SFM receive beams passing through the cylindrical lens towards receive antennas associated with the transmit antennas in the group of antenna pixels;

combining the SFM receive beams from the receive antennas to provide a total receive beam; and combining the total receive beam and the first reference beam to provide a receive signal that is configured for extraction of the image data associated with the target.

24. The method of claim 23 further comprising the steps of:

providing a plurality of source transmit beams that include the first source transmit beam and a plurality of reference beams that include the first reference beam;

selecting the first source transmit beam from the plurality of source transmit beams, wherein the selected first source transmit beam is associated with the first reference beam; and simultaneously generating the SFM transmit beams from the selected first source transmit beam.

25. The method of claim 23 further comprising the steps of:

providing one of the SFM transmit beams having the same optical frequency modulation as the first source transmit beam; and sequentially adding a fixed single-tone frequency shift to the optical frequency modulation of the first source transmit beam to provide the other SFM transmit beams.

26. The method of claim 23 further comprising the steps of:

splitting the first source transmit beam into a number of split source transmit beams which equals the number of transmit antennas in the group of antenna pixels;

providing one of the split source transmit beams as the one of the SFM transmit beams having the optical frequency modulation of the first source transmit beam; and sequentially adding the fixed single-tone frequency shift to the optical frequency modulation of the first source transmit beam to provide the other SFM transmit beams.

\* \* \* \* \*